(12) United States Patent
Miyasaka (10) Patent No.: US 10,179,844 B2
(45) Date of Patent: Jan. 15, 2019

(54) BIAXIALLY STRETCHED POLYESTER FILM AND METHOD FOR PRODUCING SAME, AND OPTICAL SHEET

(71) Applicant: FUJIFILM Corporation, Tokyo (JP)

(72) Inventor: Rei Miyasaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 236 days.

(21) Appl. No.: 15/001,253

(22) Filed: Jan. 20, 2016

(65) Prior Publication Data
US 2016/0130415 A1  May 12, 2016

Related U.S. Application Data

(63) Continuation of application No. PCT/JP2014/069358, filed on Jul. 22, 2014.

(30) Foreign Application Priority Data

Jul. 23, 2013  (JP) ................ 2013-152970

(51) Int. Cl.
*B32B 7/10* (2006.01)
*B32B 27/36* (2006.01)
(Continued)

(52) U.S. Cl.
CPC ............ *C08J 5/18* (2013.01); *B29C 47/0021* (2013.01); *B29C 55/16* (2013.01); *C08G 63/78* (2013.01); *C08G 63/86* (2013.01); *C08K 5/521* (2013.01); *C08K 13/00* (2013.01); *C09J 7/0285* (2013.01); *C09J 7/255* (2018.01); *B29K 2267/00* (2013.01); *B29L 2007/008* (2013.01); *B32B 7/10* (2013.01);
(Continued)

(58) Field of Classification Search
None
See application file for complete search history.

(56) References Cited

U.S. PATENT DOCUMENTS 3,929,728 A * 12/1975 Chimura ............. C08G 63/181
528/275
3,951,905 A *  4/1976 Sano ................... C08K 3/32
524/399
(Continued)

FOREIGN PATENT DOCUMENTS

JP    58-057431 A  *  4/1983
JP    01-184355 A  *  7/1989
(Continued)

OTHER PUBLICATIONS

"Office Action of Korea Counterpart Application" with English translation thereof, dated Feb. 22, 2017, p 1-8.
(Continued)

*Primary Examiner* — Vivian Chen
(74) *Attorney, Agent, or Firm* — JCIPRNET (57) ABSTRACT

Disclosed is a biaxially stretched polyester film containing an antimony compound as a catalyst component, and a magnesium compound and a phosphorus compound as additives, in which an amount of metal antimony included in residues on a membrane filter having an average pore diameter of 0.1 μm, after a solution in which 1 g of the biaxially stretched polyester is dissolved in 5 ml of hexafluoroisopropanol is filtered by the filter, is 10 to 100 mg per 1 kg of the biaxially stretched polyester.

6 Claims, 1 Drawing Sheet

(51) Int. Cl.
| | |
|---|---|
| *B32B 27/30* | (2006.01) |
| *B32B 27/40* | (2006.01) |
| *B32B 27/42* | (2006.01) |
| *C08G 63/12* | (2006.01) |
| *C08G 63/16* | (2006.01) |
| *C08G 63/82* | (2006.01) |
| *C08G 63/84* | (2006.01) |
| *C08G 63/87* | (2006.01) |
| *C08L 67/02* | (2006.01) |
| *C08L 67/03* | (2006.01) |
| *C09J 133/00* | (2006.01) |
| *C09J 133/02* | (2006.01) |
| *C09J 133/04* | (2006.01) |
| *C09J 167/00* | (2006.01) |
| *C09J 167/02* | (2006.01) |
| *C09J 175/04* | (2006.01) |
| *C09J 161/28* | (2006.01) |
| *C09J 179/00* | (2006.01) |
| *C08K 3/11* | (2018.01) |
| *C08K 3/105* | (2018.01) |
| *C08K 3/32* | (2006.01) |
| *C08J 5/18* | (2006.01) |
| *C08G 63/86* | (2006.01) |
| *C08K 13/00* | (2006.01) |
| *C08G 63/78* | (2006.01) |
| *B29C 55/16* | (2006.01) |
| *B29C 47/00* | (2006.01) |
| *C08K 5/521* | (2006.01) |
| *C09J 7/02* | (2006.01) |
| *C09J 7/25* | (2018.01) |
| *B29K 267/00* | (2006.01) |
| *B29L 7/00* | (2006.01) |

(52) U.S. Cl.
CPC ............ *B32B 27/30* (2013.01); *B32B 27/308* (2013.01); *B32B 27/36* (2013.01); *B32B 27/40* (2013.01); *B32B 27/42* (2013.01); *B32B 2255/10* (2013.01); *B32B 2255/26* (2013.01); *B32B 2367/00* (2013.01); *C08G 63/12* (2013.01); *C08G 63/16* (2013.01); *C08G 63/82* (2013.01); *C08G 63/826* (2013.01); *C08G 63/84* (2013.01); *C08G 63/866* (2013.01); *C08G 63/87* (2013.01); *C08J 2367/02* (2013.01); *C08K 3/105* (2018.01); *C08K 3/11* (2018.01); *C08K 3/32* (2013.01); *C08L 67/02* (2013.01); *C08L 67/03* (2013.01); *C09J 133/00* (2013.01); *C09J 133/02* (2013.01); *C09J 133/04* (2013.01); *C09J 167/00* (2013.01); *C09J 161/28* (2013.01); *C09J 167/00* (2013.01); *C09J 167/02* (2013.01); *C09J 175/04* (2013.01); *C09J 179/00* (2013.01); *C09J 2433/00* (2013.01); *C09J 2467/006* (2013.01); *C09J 2475/006* (2013.01); *Y10T 428/31562* (2015.04); *Y10T 428/31786* (2015.04); *Y10T 428/31794* (2015.04); *Y10T 428/31797* (2015.04); *Y10T 428/31942* (2015.04)

(56) References Cited

U.S. PATENT DOCUMENTS

| | | | | |
|---|---|---|---|---|
| 5,286,836 | A * | 2/1994 | Park | C08G 63/866 528/272 |
| 5,478,911 | A * | 12/1995 | Park | C08G 63/866 502/150 |
| 5,565,545 | A * | 10/1996 | Kriesche | C08G 63/86 528/280 |
| 5,608,032 | A * | 3/1997 | Yuo | C08G 63/82 502/153 |
| 5,688,899 | A * | 11/1997 | Strand | C08G 63/6856 528/275 |
| 5,859,116 | A * | 1/1999 | Shih | C08J 5/18 524/493 |
| 6,465,063 | B1 * | 10/2002 | Hayakawa | B29C 55/08 428/34.9 |
| 7,048,995 | B2 * | 5/2006 | Fujimori | C08G 63/82 428/221 |
| 2001/0044009 | A1 * | 11/2001 | Peiffer | B32B 27/20 428/141 |
| 2002/0158369 | A1 * | 10/2002 | Takagi | B29C 47/0021 264/466 |
| 2011/0051245 | A1 * | 3/2011 | Masuda | C08J 7/047 359/584 |
| 2011/0054090 | A1 * | 3/2011 | Fujita | C08J 5/18 524/120 |
| 2011/0284075 | A1 * | 11/2011 | Hatakeyama | H01L 31/049 136/259 |
| 2012/0161358 | A1 * | 6/2012 | Al-Munif | C08G 63/85 264/234 |
| 2013/0319525 | A1 | 12/2013 | Nakai | |

FOREIGN PATENT DOCUMENTS

| | | | |
|---|---|---|---|
| JP | H01-185355 | | 7/1989 |
| JP | 10-163065 A | * | 6/1998 |
| JP | 2001-154308 A | * | 6/2001 |
| JP | 2001-342267 A | * | 12/2001 |
| JP | 2002-327053 A | * | 11/2002 |
| JP | 2003-340999 A | * | 12/2003 |
| JP | 2003-341000 A | * | 12/2003 |
| JP | 2006-070166 A | * | 3/2006 |
| JP | 4023219 | | 12/2007 |
| JP | 2010-260892 A | * | 11/2010 |
| JP | 2010260892 | | 11/2010 |
| JP | 2012-204797 A | * | 10/2012 |
| JP | 5055661 | | 10/2012 |
| JP | 2013-063632 A | * | 4/2013 |
| WO | WO 2010-110119 A | * | 9/2010 |
| WO | WO 2012-081500 A | * | 6/2012 |
| WO | 2012111531 | | 8/2012 |

OTHER PUBLICATIONS

"Office Action of Japan Counterpart Application" with machine English translation, dated Apr. 26, 2016, p. 1-6.
"Office Action of China Counterpart Application" with machine English translation, dated Jun. 3, 2016, p. 1-12.

* cited by examiner

BIAXIALLY STRETCHED POLYESTER FILM AND METHOD FOR PRODUCING SAME, AND OPTICAL SHEET

CROSS-REFERENCE TO RELATED APPLICATIONS

This application is a continuation application of International Application No. PCT/JP2014/069358, filed Jul. 22, 2014, which is incorporated herein by reference. Further, this application claims priority from Japanese Patent Application No. 2013-152970, filed Jul. 23, 2013, which is incorporated herein by reference.

BACKGROUND OF THE INVENTION

1. Field of the Invention

The present invention relates to a biaxially stretched polyester film and a method for producing the biaxially stretched polyester film, and an optical sheet.

2. Description of the Related Art

In the related art, it has been known that a biaxially stretched polyester film, in particular, a biaxially stretched film of polyethylene terephthalate or polyethylene naphthalate has excellent mechanical properties, heat resistance, and chemical resistance. The biaxially stretched polyester film has been widely used as a material of a magnetic tape, a ferromagnetic thin film tape, a photographic film, a film for package, a film for an electronic member, an electric insulating film, a film for a metal laminate, a film bonded to a glass surface, such as a glass display film, a protective film for various members, and the like.

Recently, the biaxially stretched polyester film has been generally used, in particular, in various optical films, and has been used in various applications of a base film such as a prism sheet, a light diffusing sheet, a reflection plate, and a touch panel of a member of a liquid crystal display device (LCD), a base film for preventing reflection, a base film for preventing display explosion, a film for a plasma display panel (PDP) filter, and the like.

In order to be suitably applied to such an optical film, it is necessary that the biaxially stretched polyester film has transparency, and the biaxially stretched polyester film has excellent adhesion between the adjacent materials (for example, coating layers), durability in which a color is not changed to a yellow color or the like due to heating at the time of molding or aging, and the like.

In JP1989-185355A (JP-H01-185355), a polyester composition containing antimony metal particles having a small size in which the long diameter is greater than or equal to 0.01 μm and less than or equal to 1 μm is disclosed as a technology relevant to the above circumstances.

In addition, in JP5055661B, a producing method is disclosed in which an antimony compound is used as a polycondensation catalyst performing a polycondensation reaction between a dicarboxylic acid component and a diol component, and the timing of adding each of a magnesium compound and a phosphorus compound is adjusted during the polycondensation reaction, and thus polyester for a film is produced. It is disclosed that in the polyester for a film produced in the producing method described above, the amount of antimony in the residues on a membrane filter having an average pore diameter of 0.1 μm after a solution in which parachlorophenol and tetrachloroethane are dissolved in a solvent at a ratio of 75:25 (a weight ratio) is filtered by the membrane filter is less than or equal to 1 mg/1 kg of polyester. Further, it is disclosed that a biaxially stretched polyester film prepared by using the polyester for a film produced in the producing method described above has excellent transparency.

Further, in JP4023219B, an easily adhesive polyester film for a prism lens sheet is disclosed in which an easily adhesive layer containing a resin such as a polyester resin or a polyurethane resin as a main component is disposed on at least one surface of a biaxially aligned polyester film having a thickness of 50 μm to 300 μm which contains an antimony compound, an alkali earth metal compound, and a phosphorus compound.

SUMMARY OF THE INVENTION

The antimony compound used in the polycondensation catalyst may be reduced during the reaction and be educed as metal particles. In the eduction mechanism of the antimony metal particles, for example, as reported in POLYMER ENGINEERING AND SCIENCE July 1998 Vol. 38, No. 7, antimony oxide which is a catalyst is reduced by carbon monoxide (CO) which is reducing gas generated due to thermal decomposition of ethylene glycol (hereinafter, referred to as EG), and is educed in polyester as metal antimony.

However, when a large amount of antimony metal particles are in the film, transparency deteriorates.

On the other hand, when the biaxially stretched polyester film is used as the optical film, an additional layer such as an adjacent layer may be disposed on the surface of the biaxially stretched polyester film from various reasons. In such a case, adhesion between the biaxially stretched polyester film and the additional layer such as the adjacent layer is required to be strong.

However, as in the polyester for a film disclosed in JP5055661B described above, the biaxially stretched polyester film prepared by using the polyester for a film in which the amount of antimony after the filtration of the membrane filter having an average pore diameter of 0.1 μm is less than or equal to 1 ppm has a small amount of antimony which becomes foreign matter, and thus has excellent transparency, but when the adjacent layer is formed, it is found that necessary and sufficient adhesiveness between the adjacent layer and the biaxially stretched polyester film is not ensured.

The present invention has been made in consideration of the above circumstances, and an object of the present invention is to provide a biaxially stretched polyester film having excellent adhesiveness with respect to an adjacent layer (for example, coating layer) and excellent transparency and a method for producing the biaxially stretched polyester film, and an optical sheet, and to attain the object.

A clear reason for a causal relationship between the content of the metal antimony contained in the polyester, and the adhesiveness and the transparency described above has not been know, but the following causal relationship is considered.

When the content of the metal antimony excessively decreases, a function of accelerating crystal (spherocrystal) growth of the polyester by using the metal antimony as a nucleus decreases. For this reason, when a biaxially stretched polyester film is produced by using the polyester in which the content of the metal antimony is small, the crystal growth of the polyester on the surface of the biaxially stretched polyester film becomes slow, and thus it is difficult to form micro convexities and concavities on the film surface, and as a result thereof, the adhesion with respect to the adjacent layer decreases.

On the other hand, when the amount of metal antimony contained in the polyester excessively increases, the haze of the biaxially stretched polyester film produced by using the polyester deteriorates, and the transparency also decreases.

The present invention has been attained by obtaining knowledge that containing metal antimony which is derived from an antimony compound used as a polycondensation catalyst and is mixed into a film in the film in a suitable range is effective.

In the present invention, specific means for attaining the object described above is as follows.

<1> A biaxially stretched polyester film containing an antimony compound as a catalyst component, and a magnesium compound and a phosphorus compound as additives, in which an amount of metal antimony included in residues on a membrane filter having an average pore diameter of 0.1 μm, after a solution in which 1 g of the biaxially stretched polyester is dissolved in 5 ml of hexafluoroisopropanol is filtered by the filter, is greater than 1 mg per 1 kg and less than or equal to 100 mg per 1 kg of the biaxially stretched polyester.

<2> The biaxially stretched polyester film according to <1>, in which a micro heat absorption peak temperature Tmeta (° C.) of the biaxially stretched polyester film obtained by differential scanning calorimetry (DSC) satisfies the following Expression 1:

$$210° C. \leq Tmeta \leq 230° C.$$ (Expression 1).

<3> The biaxially stretched polyester film according to <1> or <2>, in which the biaxially stretched polyester film contains diethylene glycol, and a content of the diethylene glycol is from 1.0 mol % to 1.5 mol %.

<4> The biaxially stretched polyester film according to any one of <1> to <3>, in which the biaxially stretched polyester film further satisfies a relationship denoted by the following Expression 2:

$$20 \text{ ppm} \leq W_P \leq W_{Mg} \leq 55 \text{ ppm}$$ (Expression 2)

wherein in Expression 2, $W_P$ represents a content (ppm) of phosphorus in the biaxially stretched polyester film, and $W_{Mg}$ represents a content (ppm) of magnesium in the biaxially stretched polyester film.

<5> The biaxially stretched polyester film according to any one of <1> to <4>, in which the biaxially stretched polyester film is used in an optical sheet.

<6> A method for producing a biaxially stretched polyester film, the method comprising:

performing an esterification reaction through at least two series-connected esterification reactors including a first esterification reactor in which a magnesium compound is added to a composition including a dicarboxylic acid component, a diol component, and an antimony compound and a second esterification reactor which is arranged on a downstream side of the first esterification reactor and in which a phosphorus compound is added to the composition to which the magnesium compound has been added;

performing a polycondensation reaction with respect to an esterification reaction product generated in the esterification reaction, through at least two polycondensation reactors including a first polycondensation reactor in which a pressure is less than or equal to $6.00 \times 10^3$ Pa and a second polycondensation reactor which is arranged on a downstream side of the first polycondensation reactor and in which a pressure is less than or equal to $0.60 \times 10^3$ Pa;

forming a film by melting and extruding a polyester generated via at least the esterification reaction and the polycondensation reaction;

vertically stretching a formed polyester film in a longitudinal direction; and horizontally stretching the vertically stretched polyester film.

<7> The method for producing a biaxially stretched polyester film according to <6>, in which in the esterification reaction, the esterification reaction is performed by continuously moving the composition through at least two esterification reactors in sequence from the first esterification reactor.

<8> The method for producing a biaxially stretched polyester film according to <6> or <7>, in which in the polycondensation reaction, the polycondensation reaction is performed by continuously moving the esterification reaction product obtained in the esterification reaction through at least two polycondensation reactors in sequence from the first polycondensation reactor.

<9> An optical sheet, including the biaxially stretched polyester film according to any one of <1> to <4>; and an easily adhesive layer which is disposed on at least one surface of the biaxially stretched polyester film, and contains at least one type of resin selected from a polyester resin, a urethane resin, an acrylic resin, or a melamine resin, in an amount of greater than or equal to 50 mass %.

According to the present invention, a biaxially stretched polyester film having excellent adhesiveness with respect to an adjacent layer (for example, a coating layer) and excellent transparency, a method for producing the biaxially stretched polyester film, and an optical sheet are provided.

DESCRIPTION OF THE PREFERRED EMBODIMENTS

Hereinafter, a biaxially stretched polyester film and a method for producing the biaxially stretched polyester film of the present invention will be described in detail.

<Biaxially Stretched Polyester Film and Method for Producing Same>

The biaxially stretched polyester film of the present invention contains an antimony compound as a catalyst component, and a magnesium compound and a phosphorus compound as additives, and the amount of metal antimony included in residues on a membrane filter having an average pore diameter of 0.1 μm after a solution in which 1 g of polyester is dissolved in 5 ml of hexafluoroisopropanol is filtered by the filter is greater than 1 mg and less than or equal to 100 mg per 1 kg of polyester.

From the related art, a technology for producing polyester using an antimony compound represented by antimony oxide as a polycondensation catalyst performing a polycondensation reaction between a dicarboxylic acid component and a diol component has been widely known. In general, the antimony compound described above is reduced during a production process and becomes metal antimony, and is mixed in the produced polyester as foreign matter.

Further performance improvement is required in consideration of an application of an optical sheet such as a prism lens sheet, and as a result thereof, it has been found that containing a suitable amount of metal antimony with a certain amount is more advantageous than reducing the amount of metal antimony to be less than or equal to 1 mg/1 kg of polyester. That is, metal antimony is actively contained in the film in a range where the content of metal antimony is neither excessively small nor excessively large without reducing the content of metal antimony to be less than or equal to 1 mg/1 kg of polyester as described in the technology of the related art, and thus it is effective for transparency of the film and for prevention of coloration, spherocrystal growth is suitably accelerated while maintaining a crystallization speed of polyester on a film surface, and adhesiveness with respect to an adjacent layer becomes excellent.

The biaxially stretched polyester film of the present invention, for example, is able to be used as a base film of a prism sheet, a light diffusing sheet, a reflection plate, a touch panel, and the like which are members of a liquid crystal display device (LCD). Further, the biaxially stretched polyester film of the present invention is able to be used for an optical sheet such as a base film for preventing reflection, a base film for preventing display explosion, and a film for a plasma display panel (PDP) filter.

The polyester used for producing the biaxially stretched polyester film of the present invention, as described below, is synthesized by being polymerized through an esterification reaction and a polycondensation reaction by using the dicarboxylic acid component, the diol component, and the antimony compound as the polycondensation catalyst, and the magnesium compound and the phosphorus compound as additives.

In the present invention, after a solution in which 1 g of the polyester used for forming the biaxially stretched polyester film is dissolved in 5 ml of hexafluoroisopropanol (HFIP) is subjected to suction filtration (suction pressure 3 kPa to 4 kPa) by using a membrane filter of hydrophilic polytetrafluoroethylene having an average pore diameter of 0.1 µm, the amount of metal antimony included in the residues on the filter is set to be in a range of greater than 1 mg/1 kg of polyester and less than or equal to 100 mg/1 kg of polyester.

Omnipore manufactured by EMD Millipore Corporation is used as the membrane filter.

Thus, the amount of metal antimony contained in the film is set to be in a range of neither excessively small nor excessively large, and thus the transparency of the film becomes excellent, and adhesion at the time of forming the adjacent layer by performing, for example, coating with respect to the film surface, becomes excellent.

In the film, the metal antimony accelerates crystallization by being used as a nucleus of the crystallization of the polyester. The crystallization of the polyester becomes slow as the amount of metal antimony included in the residues after the filtration becomes smaller, for example, less than or equal to 1 mg/1 kg of polyester, the crystal growth on the film surface at the time of stretching becomes slow, and thus it is difficult to form micro convexities and concavities on the film surface, and as a result thereof, the adhesion with respect to the adjacent layer decreases. In contrast, the haze of the film increases as the amount of metal antimony included in the residues after the filtration becomes larger, for example, greater than 100 mg/1 kg of polyester, and thus the transparency deteriorates.

In the above description, the amount of metal antimony included in the residues after the filtration is preferably 10 mg to 75 mg per 1 kg of polyester, and is more preferably 20 mg to 50 mg per 1 kg of polyester.

Metal antimony in which a content ratio of Sb metal particles having an average pore diameter of greater than 0.1 µm to the total Sb particles is greater than or equal to 50 number % is preferable as the particulate metal antimony in the residues. In addition, when the average particle diameter is excessively large, the transparency or the haze decreases, and thus it is preferable that the upper limit value of the average particle diameter is 5 µm.

The amount of metal antimony (the Sb amount) included in the residues after the filtration is obtained by dissolving a filter product (the residues) remaining on the filter after the filtration in $HNO_3$ and by using high-resolution type high-frequency inductively-coupled plasma-mass analyzer (HR-ICP-MS; AttoM, manufactured by Hitachi High-Tech Science Corporation).

In the biaxially stretched polyester film of the present invention, it is preferable that a micro heat absorption peak temperature Tmeta [° C.] obtained by differential scanning calorimetry (DSC) satisfies Expression 1 described below.

$$210° C. \leq Tmeta \leq 230° C. \qquad \text{(Expression 1)}$$

The range of the micro heat absorption peak temperature described above, as described below, is able to be adjusted by changing a heat treatment temperature at the time of forming the film. In order to set Tmeta to be lower than or equal to 230° C., it is preferable that the heat treatment temperature is lower than or equal to 230° C.

When the micro heat absorption peak temperature Tmeta is higher than or equal to 210° C., transmittance becomes excellent, and excellent adhesiveness with respect to the adjacent layer is easily obtained. Further, it is possible to prevent the center portion of the polyester film from being loosened compared to an end portion in a width direction during the producing step, and thus it is possible to prevent wrinkles or scratches from occurring due to a loosening difference between the end portion and the center portion. On the other hand, when the micro heat absorption peak temperature Tmeta is lower than or equal to 230° C., it is possible to make the adhesiveness with respect to the adjacent layer excellent, it is possible to suppress yellowing of the base due to heat, and it is possible to suppress an increase in the haze due to the crystal growth.

Among them, the micro heat absorption peak temperature Tmeta is preferably 210° C. to 225° C., and is more preferably 210° C. to 220° C.

The micro heat absorption peak temperature (Tmeta) is measured as follows.

5 mg of the film was weighed in a sample pan, and measurement is performed from 25° C. to 300° C. at a temperature rising rate of 20° C./minute by using a differential scanning calorimetry device DSC-60 (manufactured by Shimadzu Corporation). A micro heat absorption peak temperature before a crystal melting peak in the obtained differential scanning calorimetry chart is set to the micro heat absorption peak temperature (° C.).

It is preferable that the content of diethylene glycol (DEG) in the biaxially stretched polyester film is greater than or equal to 1.0 mol % and less than or equal to 1.5 mol %. The content of DEG affects the crystallization of the polyester in the film. Specifically, by setting the content of DEG to be greater than or equal to 1.0 mol %, an increase in the haze at the time of forming the film due to an increase in the crystallization speed of the polyester is suppressed, and it is possible to maintain excellent transparency. In addition, by setting the content of DEG to be less than or equal to 1.5 mol %, it is possible to suppress a decrease in physical properties (heat resistance) of the biaxially stretched polyester film in which DEG is copolymerized.

Among them, it is more preferable that the content of DEG is in a range of from 1.1 mol % to 1.3 mol %.

In addition, it is preferable that the biaxially stretched polyester film of the present invention satisfies a relationship denoted by Expression 2 described below. In Expression 2 described below, $W_P$ represents the content (ppm) of phosphorus (P) in the polyester film, and $W_{Mg}$ represents the content (ppm) of magnesium (Mg) in the polyester film.

$$20 \text{ ppm} \leq W_P \leq W_{Mg} \leq 55 \text{ ppm} \quad \text{(Expression 2)}$$

By having a balance between the P content and the Mg content as denoted by Expression 2, it is possible to make a tint and melting resistivity compatible.

In Expression 2 described above, the P content is set to be greater than or equal to 20 ppm, and thus it is possible to maintain an excellent tint having reduced yellowing, and the P content is set to be less than or equal to 55 ppm and to be less than or equal to the Mg content, and thus an effect of imparting electrostatic applying properties due to a Mg component is not impaired.

In addition, the Mg content is set to be less than or equal to 55 ppm, and thus it is possible to suppress yellowing and to maintain an excellent tint, and the Mg content is set to be greater than or equal to 20 ppm and to be greater than or equal to the P content, and thus it is possible to maintain excellent melting resistivity.

In the above description, a range satisfying Expression 3 described below is more preferable, and a range satisfying Expression 4 described below is even more preferable.

$$30 \text{ ppm} \leq W_P \leq W_{Mg} \leq 50 \text{ ppm} \quad \text{(Expression 3)}$$

$$35 \text{ ppm} \leq W_P \leq W_{Mg} \leq 45 \text{ ppm} \quad \text{(Expression 4)}$$

Furthermore, the Mg content and the P content [ppm] contained in the biaxially stretched polyester film (or the polyester used for producing the biaxially stretched polyester film described below) are able to be quantitated by using a high-resolution type high-frequency inductively-coupled plasma-mass analyzer (HR-ICP-MS; AttoM, manufactured by Hitachi High-Tech Science Corporation).

In the present invention, when the biaxially stretched polyester film or 1 g of the polyester used for producing the biaxially stretched polyester film is dissolved in 5 ml of hexafluoroisopropanol (HFIP), it is preferable that spectral transmittance of light having a wavelength of 450 nm is greater than or equal to 99%. The spectral transmittance greater than or equal to 99% indicates that the biaxially stretched polyester film and the polyester used for producing the biaxially stretched polyester film have excellent transparency, and absorption of the light having a wavelength of 450 nm is small.

Furthermore, the spectral transmittance is measured by using a UV-visible spectrophotometer (UV-2450, manufactured by Shimadzu Corporation).

When the haze is measured by dissolving the biaxially stretched polyester film or 1 g of the polyester used for producing the biaxially stretched polyester film in 5 ml of HFIP, and by putting the mixture into a quartz cell having a thickness of 2 mm, it is preferable that the haze is less than or equal to 0.5%. The haze is an index for evaluating the transparency of the polyester, and indicates turbidity (cloudiness). The haze of less than or equal to 0.5% indicates high transparency.

The haze is a value obtained from the following expression by measuring diffuse transmittance and the total light transmittance by using a haze meter (NDH2000, manufactured by Nippon Denshoku Industries Co., Ltd.). In the expression, Td represents the diffuse transmittance, and Tt represents the total light transmittance.

$$\text{Haze (\%)} = Td/Tt \times 100$$

Next, a method for synthesizing the polyester will be described.

The polyester of the present invention is obtained using a dicarboxylic acid component and a diol component as a raw material, and by performing an esterification reaction and a polycondensation reaction with respect to the components.

Examples of the dicarboxylic acid component include a dicarboxylic acid or an ester derivative thereof such as aliphatic dicarboxylic acids such as a malonic acid, a succinic acid, a glutaric acid, an adipic acid, a suberic acid, a sebacic acid, a dodecane dionic acid, a dimer acid, an eicosane dionic acid, a pimelic acid, an azelaic acid, a methyl malonic acid, and an ethyl malonic acid, an alicyclic dicarboxylic acid such as an adamantane dicarboxylic acid, a norbornene dicarboxylic acid, isosorbide, a cyclohexane dicarboxylic acid, and decaline dicarboxylic acid, aromatic dicarboxylic acid such as a terephthalic acid, an isophthalic acid, a phthalic acid, a 1,4-naphthalene dicarboxylic acid, a 1,5-naphthalene dicarboxylic acid, a 2,6-naphthalene dicarboxylic acid, a 1,8-naphthalene dicarboxylic acid, a 4,4'-diphenyl dicarboxylic acid, a 4,4'-diphenyl ether dicarboxylic acid, a 5-sodium sulfoisophthalic acid, a phenyl indane dicarboxylic acid, an anthracene dicarboxylic acid, a phenanthrene dicarboxylic acid, and a 9,9'-bis(4-carboxy phenyl) fluorenic acid.

It is preferable that at least one type of aromatic dicarboxylic acid is used as the dicarboxylic acid component. It is more preferable that an aromatic dicarboxylic acid is contained in the dicarboxylic acid component as a main component. Furthermore, the "main component" indicates that a ratio of the aromatic dicarboxylic acid to the dicarboxylic acid component is greater than or equal to 80 mass %.

Examples of the diol component include aliphatic diols such as ethylene glycol, 1,2-propane diol, 1,3-propane diol, 1,4-butane diol, 1,2-butane diol, and 1,3-butane diol, alicyclic diols such as cyclohexane dimethanol, spiro glycol, and isosorbide, aromatic diols such as bisphenol A, 1,3-benzene dimethanol, 1,4-benzene dimethanol, and 9,9'-bis(4-hydroxy phenyl) fluorene, and the like.

In addition, it is preferable that at least one type of aliphatic diol is used as the diol component. It is possible to include ethylene glycol as the aliphatic diol, and it is preferable that the ethylene glycol is contained as a main component. Furthermore, the "main component" indicates that a ratio of the ethylene glycol to the diol component is greater than or equal to 80 mass %.

As described above, polyethylene terephthalate (PET), polyethylene-2,6-naphthalate (PEN), and polybutylene terephthalate (PBT) are preferable as the polyester obtained using the dicarboxylic acid component and the diol component, and PET is more preferable from a viewpoint of excellent cost performance of a resin.

Next, the polycondensation catalyst will be described.

In the present invention, the antimony compound is mainly used as the polycondensation catalyst. Examples of the antimony compound used as the polycondensation catalyst of the polyester include antimony trioxide, antimony pentoxide, antimony acetate, antimony glycoxide, and the like. In particular, the antimony trioxide is preferable.

One type of antimony compound may be independently used, or two or more types thereof may be used together.

It is preferable that in the antimony compound, a content ratio of antimony atoms (Sb) to the finally obtained polyester is in a range of from 100 ppm to 200 ppm. When the content ratio of Sb is greater than or equal to 100 ppm, polymerization productivity is excellent. On the other hand, when the content ratio of Sb is less than or equal to 200 ppm, it is possible to suppress a decrease in transparency due to insoluble foreign matter.

It is more preferable that the content of the Sb atoms is in a range of from 120 ppm to 160 ppm.

A catalyst component other than the antimony compound may be used together as the polycondensation catalyst. Examples of the catalyst component other than the antimony compound include a germanium compound, a titanium compound, and the like. When these compounds are used, it is preferable that the amount of the compound is in a range where the content of germanium atoms or titanium atoms with respect to the finally produced polyester is less than or equal to 50 ppm.

In the present invention, the antimony compound is contained as the catalyst component, and the magnesium (Mg) compound and the phosphorus (P) compound are contained as the additives.

Examples of the magnesium compound include a lower fatty acid salt such as magnesium hydroxide and magnesium acetate, alkoxide such as magnesium methoxide, and the like. Among them, the magnesium acetate is particularly preferable.

One type of magnesium compound may be independently used or two or more types thereof may be used together.

As described above, the added amount of the magnesium compound is preferably in a range where a Mg element conversion value (that is, a Mg content $W_{Mg}$ in the molded film) satisfies 20 ppm≤$W_{Mg}$≤55 ppm, and is more preferably in a range where the Mg element conversion value satisfies 35 ppm≤$W_{Mg}$≤45 ppm.

The added amount of the magnesium compound is set to be in the range described above, and thus the polyester having reduced yellowing and an excellent tint is able to be obtained.

Examples of the phosphorus compound include a phosphoric acid, trimethyl phosphate, tributyl phosphate, triphenyl phosphate, monomethyl phosphate, dimethyl phosphate, monobutyl phosphate, dibutyl phosphate, a phosphorous acid, trimethyl phosphite, tributyl phosphite, a phosphonic acid, methyl phosphonate, dimethyl methyl phosphonate, dimethyl ethyl phosphonate, dimethyl phenyl phosphonate, diethyl phenyl phosphonate, diphenyl phenyl phosphonate, and the like. Among them, the trimethyl phosphate and the phosphoric acid are particularly preferable.

One type of phosphorus compound may be independently used, or two or more types thereof may be used together.

As described above, the added amount of the phosphorus compound is preferably in a range where a P element conversion value (that is, a P content $W_P$ in the molded film) satisfies 20 ppm≤$W_P$≤55 ppm, and is more preferably in a range where the P element conversion value satisfies 35 ppm≤$W_P$≤45 ppm.

The added amount of the phosphorus compound is set to be in the range described above, and thus the polyester having reduced yellowing and excellent color tone is able to be obtained, and excellent melting resistivity is able to be maintained.

Furthermore, the content of the magnesium compound and the phosphorus compound contained in the polyester is able to be measured by quantitating the amount of Mg element and the amount of P element contained in the compounds using a high-resolution type high-frequency inductively-coupled plasma-mass analyzer (HR-ICP-MS; AttoM, manufactured by Hitachi High-Tech Science Corporation), and by calculating the content [ppm] from the obtained result.

It is preferable that intrinsic viscosity (IV) of the polyester is 0.63 dl/g to 0.66 dl/g. When IV is greater than or equal to 0.63 dl/g, it is possible to maintain the molecular weight of the polyester to be in a desired range, and it is possible to obtain excellent adhesion without aggregation breakdown in an adhesion boundary. In addition, when IV is less than or equal to 0.66 dl/g, it is possible to suppress thermal decomposition of the polyester due to shear heat generation at the time of melting and extruding, and it is possible to suppress a decrease in coloration or IV due to thermal decomposition and an increase in an Acid Value (AV).

Here, the intrinsic viscosity (IV) is a value in which a value obtained by dividing specific viscosity ($\eta_{sp}=\eta_r-1$) which is obtained by subtracting 1 from a ratio $\eta_r$ ($=\eta/\eta_0$; relative viscosity) of solution viscosity ($\eta$) and solvent viscosity ($\eta_0$) by a concentration is extrapolated to a state where the concentration is zero. The intrinsic viscosity (IV) is calculated by using a three-point method in which the obtained biaxially stretched PET film is dissolved in a mixed solvent of 1,1,2,2-tetrachloroethane/phenol (=2/3 [mass ratio]), relative viscosity $\eta_0$ at 25° C. is measured by using a Ubbelohde type viscosity tube, and $\eta_{sp}/C$ is obtained from specific viscosity ($\eta_{sp}$) and a concentration C obtained from the relative viscosity.

In addition, it is preferable that the amount of terminal carboxy group (the amount of terminal COOH; AV) of the polyester has an acid value of 10 eq/ton to 30 eq/ton. When the polyester has AV of greater than or equal to 10 eq/ton, for example, it is less necessary that a polymerization temperature decreases, and thus it is possible to maintain excellent polymerization productivity. On the other hand, when the polyester has AV of less than or equal to 30 eq/ton, hydrolysis stability is excellent, and it is possible to maintain limiting viscosity at the time of forming the film. It is more preferable that AV is 15 eq/ton to 25 eq/ton.

"The amount of terminal COOH" indicates that the amount of carboxyl group (—COOH) in the terminal of the polyester. Furthermore, "eq/ton" indicates molar equivalent per 1 ton.

The amount of terminal COOH is obtained by completely dissolving the obtained biaxially stretched polyester film in a mixed solution of benzyl alcohol/chloroform (=2/3; volume ratio), by using phenol red as an indicator, by performing titration with a reference liquid (a mixed solution of 0.025 N KOH-methanol), and by calculating the amount of terminal COOH from the titration amount.

In addition, in the polyester, it is preferable that a color tone change (a b value) at the time of forming a pellet after the polycondensation satisfies Expression a described below.

$$b \text{Value} < 3.5 \quad \text{(Expression a)}$$

Here, the b value is an index indicating tint, and is a value measured by using a color difference meter (SE2000, manufactured by Nippon Denshoku Industries Co., Ltd.).

The polyester obtained by the polycondensation is formed into a pellet, and the b value of the pellet is set to be less than 3.5, and preferably, is set to be less than 1.5, and thus yellow tint decreases, and transparency becomes excellent.

In the polyester, it is preferable that melting resistivity at 290° C. is less than $0.4 \times 10^8$ Ω·m.

The melting resistivity at 290° C. is a resistivity value Si (Ω·cm) obtained by disposing two electrodes (stainless steel wire) in the polyester melted at 290° C., by measuring a current ($I_o$) at the time of applying a voltage of 120 V, and by applying the current ($I_o$) to the following expression.

$$Si \text{ (Ω·cm)} = (A/L) \times (V/I_o)$$

[A: Area between Electrodes (cm$^2$), L=Distance between Electrodes (cm), and V=Voltage (V)]

The melting resistivity is an index of electrostatic adhesiveness at the time of forming the polyester film on a cooling drum by an electrostatic adhesive casting method. It is preferable that the melting resistivity is greater than or equal to $0.10\times10^8$ Ω·cm and less than $0.40\times10^8$ Ω·cm from a viewpoint of obtaining excellent electrostatic adhesiveness and of stably forming a film having high thickness evenness. The melting resistivity depends on a balance between the content of the Mg compound and the content of the P compound, and when the melting resistivity is greater than or equal to $0.1\times10^8$ Ω·cm, excellent electrostatic adhesiveness is obtained, and the content of the Mg compound is small, and thus coloration is able to be suppressed. In addition, when the melting resistivity is less than $0.4\times10^8$ Ω·cm, the coloration is suppressed, insoluble foreign matter due to a mutual interaction between the Mg component and the P component is rarely generated, and thus transparency becomes excellent.

Furthermore, the electrostatic adhesiveness is evaluated by disposing an electrode of tungsten wire between a mouthpiece portion and a cooling drum of an extruder, by applying a voltage of 10 KV to 15 KV between the electrode and the cooling drum, by performing casting, by visually observing the surface of the obtained casting original sheet, and by performing evaluation at a casting speed at which spinner bubbles start to be generated. The electrostatic adhesiveness of the polymer becomes excellent as the casting speed becomes higher.

The biaxially stretched polyester film of the present invention may be produced by any method insofar as the produced biaxially stretched polyester film contains the antimony compound as the catalyst component, and the magnesium compound and the phosphorus compound as the additives, and the amount of metal antimony included in the residues on the membrane filter having an average pore diameter 0.1 µm after an HFIP solution (a solution in which 1 g of polyester is dissolved in 5 ml of hexafluoroisopropanol) is filtered by the filter is greater than 1 mg and less than or equal to 100 mg per 1 kg of polyester. Preferably, the biaxially stretched polyester film of the present invention is produced by the following method (a method for producing the biaxially stretched polyester film of the present invention).

The method for producing the biaxially stretched polyester film of the present invention includes Step (1) to Step (5) described below. The method for producing the biaxially stretched polyester film of the present invention, as necessary, may further include other steps.

(1) An esterification reacting step of performing an esterification reaction through at least two series-connected esterification reactors including a first esterification reactor in which the total amount of a magnesium compound is added to a composition including a dicarboxylic acid component, a diol component, and an antimony compound and a second esterification reactor which is arranged on a downstream side of the first esterification reactor and in which the total amount of a phosphorus compound is added to the composition including the magnesium compound added thereto;

(2) A polycondensation reacting step of performing a polycondensation reaction with respect to an esterification reaction product generated in the esterification reacting step through at least two polycondensation reactors including a first polycondensation reactor in which a pressure is less than or equal to $6.00\times10^3$ Pa (45 torr) and a second polycondensation reactor which is arranged on a downstream side of the first polycondensation reactor and in which a pressure is less than or equal to $0.60\times10^3$ Pa (4.5 torr);

(3) A film forming step of forming a film by melting and extruding polyester generated through at least the esterification reacting step and the polycondensation reacting step;

(4) A vertical stretching step of vertically stretching a formed polyester film in a longitudinal direction; and (5) A horizontal stretching step of horizontally stretching the vertically stretched polyester film.

In the present invention, for example, two or more reaction tanks including a first reaction tank and a second reaction tank may be used by being series-connected, or two or more reaction chambers including a first reaction chamber and a second reaction chamber which are formed by, for example, dividing one reaction tank into, for example, a plurality of reaction chambers may be used by being series-connected as the at least two series-connected esterification reactors including the first esterification reactor and the second esterification reactor.

In addition, the at least two polycondensation reactors including the first polycondensation reactor and the second polycondensation reactor may be used, or, for example, the two or more reaction tanks including the first reaction tank and the second reaction tank may be used by being series-connected, or the two or more reaction chambers including the first reaction chamber and the second reaction chamber which are formed by, for example, dividing one reaction tank into, for example, a plurality of reaction chambers may be used by being series-connected.

~Esterification Reacting Step~

In the esterification reacting step of the present invention, an esterification reaction is performed between the dicarboxylic acid component and the diol component antimony compound in the presence of the catalyst containing an antimony compound through the at least two series-connected reactors. The dicarboxylic acid components described above and the diol components described above are used as the dicarboxylic acid component and the diol component.

In the esterification reacting step, a batch treatment may be performed in which a certain amount of compound in each of the esterification reactor is concurrently treated, and it is preferable that the esterification reaction is performed by continuously moving a composition containing the dicarboxylic acid component, the diol component, and the antimony compound in two or more series-connected esterification reactors in sequence from the first esterification reactor from a viewpoint of a DEG byproduct.

It is preferable that the amount of diol component (for example, ethylene glycol) is in a range of from 1.015 mol to 1.50 mol with respect to 1 mol of the dicarboxylic acid component (for example, a terephthalic acid) and the ester derivative thereof, as necessary. The amount of diol component is more preferably in a range of from 1.02 mol to 1.30 mol, is even more preferably in a range of from 1.025 mol to 1.10 mol. When the amount of diol component is greater than or equal to 1.015, the esterification reaction excellently progresses, and when the amount of diol compound is less than or equal to 1.50 mol, for example, a byproduct of diethylene glycol due to dimerization of ethylene glycol is suppressed, and various properties such as a melting point or a glass transition temperature, crystallinity, heat resistance, hydrolysis resistance, and weather resistance are able to be excellently maintained.

The dicarboxylic acid component and the diol component are able to be introduced by preparing a slurry containing the dicarboxylic acid component and the diol component, and by continuously supplying the slurry.

The esterification reacting step is able to be performed under conditions where the ethylene glycol is refluxed by using a multi-stage reaction device in which at least two reactors are connected in series while removing water or alcohol generated by the reaction to the outside.

The esterification reacting step of the present invention is performed in multiple steps by connecting at least two reactors in series. Specifically, the esterification reaction may be performed by using two reactors of a first esterification reactor in which the total amount of magnesium compound is added to the composition containing the dicarboxylic acid component, the diol component, and the antimony compound, and a second esterification reactor in which the total amount of phosphorus compound is added to the composition to which the magnesium compound is added in the first esterification reactor. In addition, the esterification reaction may be performed by using three reactors of a first esterification reactor in which the esterification reaction is performed between the dicarboxylic acid component and the diol component in the presence of the antimony compound, a second esterification reactor in which the total amount of magnesium compound is added to the composition (an esterification reactant) of the first esterification reactor, and a third esterification reactor in which the total amount of phosphorus compound is added to the composition to which the magnesium compound is added in the second esterification reactor.

Hereinafter, a case where the esterification reaction is performed by using three reactors will be described as an example.

Among the three esterification reactors which are connected in series, in the beginning esterification reactor (the first esterification reactor) positioned on the upstream side, first, the esterification reaction between the dicarboxylic acid component and the diol component starts in the presence of the antimony compound.

In the beginning esterification reactor, the reaction temperature is preferably 230° C. to 260° C., and is more preferably 240° C. to 250° C., and the pressure is preferably 0.1 MPa to 0.5 MPa, and is more preferably 0.2 MPa to 0.3 MPa.

At this time, in the added amount of antimony (Sb) compound, a Sb element conversion value is preferably 100 ppm to 200 ppm, and is more preferably 120 ppm to 160 ppm. When the Sb content is greater than or equal to 100 ppm, polymerization productivity becomes excellent. On the other hand, the content ratio of Sb is set to be less than or equal to 200 ppm, and thus it is possible to suppress a decrease in transparency due to insoluble foreign matter.

Next, in the next esterification reactor (the second esterification reactor) connected to the first esterification reactor on the downstream side, the total amount of desired magnesium compound is added to the composition (the esterification reactant) obtained by the esterification reaction in the first esterification reactor. In this case, it is preferable that the total amount of magnesium compound in which a magnesium element conversion value is 20 ppm to 55 ppm is added to the compound. In other words, it is preferable that the added amount of magnesium compound is in a range where a Mg content ($W_{Mg}$) in the film satisfies 20 ppm≤$W_{Mg}$≤55 ppm.

In the next esterification reactor, the reaction temperature is preferably 230° C. to 260° C., and is more preferably 245° C. to 255° C., and the pressure is preferably 0.05 MPa to 0.5 MPa, and is more preferably 0.1 MPa to 0.3 MPa.

Next, in the final esterification reactor (the third esterification reactor) connected to the second esterification reactor on the downstream side, the total amount of phosphorus compound is further added to the composition to which the magnesium compound is added (the esterification reactant). In this case, it is preferable that the total amount of phosphorus compound in which a phosphorus element conversion value is 20 ppm to 55 ppm is added to the compound. In other words, it is preferable that the added amount of phosphorus compound is in a range where a P content ($W_P$) in the film satisfies 20 ppm≤$W_P$≤55 ppm (and less than or equal to $W_{Mg}$).

The phosphorus compound is added to the compound preferably at a reduced pressure of greater than $13.3 \times 10^{-3}$ MPa, more preferably at a reduced pressure of greater than or equal to $66.5 \times 10^{-2}$ MPa, and particularly preferably at a reduced pressure of greater than or equal to $1.01 \times 10^{-1}$ MPa (atmospheric pressure).

In the third esterification reactor, the reaction temperature is preferably 230° C. to 260° C., and is more preferably 245° C. to 255° C., and the pressure is preferably 0.05 MPa to 0.5 MPa, and is more preferably 0.1 MPa to 0.3 MPa.

~Polycondensation Reacting Step (Ester Exchange Reacting Step)~

In the polycondensation reacting step of the present invention, the esterification reaction product generated in the esterification reacting step described above was subjected to the polycondensation reaction in multiple steps through the at least two series-connected reactors. The polycondensation reaction is not performed in one step but performed in multiple steps, and thus is advantageous in that the pressure and the temperature conditions are able to be set in multiple steps according to desired quality.

In the polycondensation reacting step, a batch treatment may be performed in which a certain amount of compound in each of the esterification reactor is concurrently treated, and it is preferable that the esterification reaction product is subjected to the polycondensation reaction by continuously moving the product in the two or more series-connected polycondensation reactors in sequence from the first polycondensation reactor, from a viewpoint of suppressing an undesirable side reaction (coloration and DEG generation).

The polycondensation reacting step is preferably performed by using a multi-stage reaction device in which at least the two reactors are connected in series. Specifically, the polycondensation reaction may be performed by using two polycondensation reactors of a first polycondensation reactor in which the pressure is less than or equal to $6.00 \times 10^3$ Pa and a second polycondensation reactor in which the pressure is less than or equal to $0.60 \times 10^3$ Pa. In addition, the polycondensation reaction may be performed by using three polycondensation reactors of the first polycondensation reactor, the second polycondensation reactor, and a third polycondensation reactor in which the pressure is less than or equal to $2.00 \times 10^3$ Pa.

The pressure is adjusted as desired, and thus it is possible to control the amount of metal antimony in the film, and therefore, it is possible to control the degree of adhesiveness with respect to an adjacent layer and coloration (in particular, yellowing), and it is possible to produce a polyester film having properties of an excellent balance.

Hereinafter, a case where the polycondensation reaction is performed by using three reactors will be described as an example.

Among the three polycondensation reactors which are connected in series, in the beginning first polycondensation reactor positioned on the upstream side, the pressure is less than or equal to $6.00×10^3$ Pa (45 torr), and is preferably $2.66×10^3$ Pa to $4.00×10^3$ Pa (20 torr to 30 torr). When the pressure is greater than $6.00×10^3$ Pa, an EG removal rate becomes slower at the initial stage of the polycondensation, and thus the amount and the size of metal antimony which becomes foreign matter increases due to the action of reducing gas which is a thermal decomposition product of EC, and the haze increases and the light transmittance decreases.

In addition, the reaction temperature in the first polycondensation reactor is preferably 255° C. to 280° C., and is more preferably 265° C. to 275° C. By setting the reaction temperature to be in the range described above, it is possible to suppress thermal decomposition of EG at the initial stage of the polycondensation, and it is possible to ensure productivity.

Next, in the second polycondensation reactor arranged on the downstream side of the first polycondensation reactor, the pressure is less than or equal to $0.60×10^3$ Pa (4.5 torr), and is preferably $0.26×10^3$ Pa to $0.40×10^3$ Pa (2 torr to 3 torr). When the pressure is greater than $0.60×10^3$ Pa, the EG removal rate during the polycondensation reaction becomes slower, and thus the eduction amount of metal antimony which becomes foreign matter increases due to the action of the reducing gas EG which is the thermal decomposition product, and the haze increases and the light transmittance decreases.

The reaction temperature in the second polycondensation reactor is preferably 265° C. to 285° C., and is more preferably 270° C. to 280° C. By setting the reaction temperature to be in the range described above, it is possible to suppress depolymerization which occurs in parallel with the polycondensation, it is possible to prevent coloration, and it is possible to ensure productivity.

In addition to the first polycondensation reactor and the second polycondensation reactor, it is preferable that the third polycondensation reactor which is the final reactor is in a state where the reaction temperature is preferably 270° C. to 290° C., and is more preferably 275° C. to 285° C., and the pressure is preferably less than or equal to $0.20×10^3$ Pa, and is more preferably $0.1×10^3$ Pa to $0.15×10^3$ Pa.

A polycondensate obtained in the polycondensation reacting step may be in the shape of a fragment such as a pellet.

Furthermore, in the method for producing the biaxially stretched polyester film of the present invention, the film forming step described below may be performed by using polyester which obtained by further performing solid phase polymerization with respect to the obtained polycondensate. By performing the solid phase polymerization, it is possible to decrease the amount of terminal COOH of the polyester to be obtained, to decrease a cyclic trimer, and to increase the degree of polymerization (IV).

~Film Forming Step~

In the film forming step of the present invention, the polyester generated through at least the esterification reacting step and the polycondensation reacting step is melted and extruded, and thus a film is formed. Specifically, the polyester generated as described above is melted and extruded as a polyester raw material, and is further cooled, and thus a polyester film is formed.

The melting and extruding of the polyester raw material, for example, is performed by using an extruder including one or two or more screws, by heating the polyester raw material at a temperature of higher than or equal to the melting point of the polyester raw material, and by rotating the screw. The polyester raw material is melted in the extruder by heating and kneading of the screw, and thus becomes a melt. In addition, it is preferable that the extruder is subjected to nitrogen substitution, and then the polyester raw material is melted and extruded, from a viewpoint of suppressing thermal decomposition (hydrolysis of the polyester) in the extruder.

The melted polyester raw material (the melt) is extruded from an extrusion die through a gear pump, a filtration device, and the like. The extrusion die will be simply referred to as a "die" [refer to JIS B8650:2006, a) Extrude Molding Machine, No. 134].

At this time, the melt may be extruded by a single layer, or may be extruded by a multi-layer.

The melt (the polyester) is extruded from the die onto a cast drum, and thus it is possible to mold the melt into the shape of a film (a cast treatment).

The thickness of a film-like polyester molding body obtained by the cast treatment is preferably 0.5 mm to 5 mm, is more preferably 0.7 mm to 4.7 mm, and is even more preferably 0.8 mm to 4.6 mm.

By setting the thickness of the film-like polyester molding body to be less than or equal to 5 mm, cooling delay due to heat accumulation of the melt is prevented, and by setting the thickness of the film-like polyester molding body to be greater than or equal to 0.5 mm, an OH group or a COOH group in the polyester is prevented from being diffused in the polyester between the extruding and the cooling, and thus the OH group and the COOH group which cause the hydrolysis are prevented from being exposed onto the surface of the polyester.

Means for cooling the melt extruded from the extrusion die is not particularly limited, cool air may be applied to the melt, the melt may be in contact with a cast drum (a cooling cast drum), or water may be sprayed on the melt. One cooling means may be performed, or a combination of two or more thereof may be performed.

Among them, it is preferable that the cooling means is at least one of cooling by cool air and cooling using a cast drum from a viewpoint of preventing an oligomer from being attached to the film surface at the time of continuous operation.

In addition, the polyester molding body which is cooled by using the cast drum or the like is peeled off from a cooling member such as the cast drum by using a peeling member such as a peeling roll.

~Vertical Stretching Step~

In the vertical stretching step of the present invention, the polyester film formed in the film forming step is vertically stretched in a longitudinal direction.

The vertical stretching of the film, for example, is able to be performed by using two or more pairs of nip rolls arranged in a transport direction while transporting the film in the longitudinal direction through a pair of nip rolls. Specifically, for example, a pair of nip rolls A are disposed on the upstream side in a film transport direction, and a pair of nip rolls B are disposed on the downstream side, the rotational speed of the nip roll B on the downstream side is slower than the rotational speed of the nip roll A on the upstream side at the time of transporting the film, and thus the film is stretched in the transport direction (Machine Direction (MD)). Furthermore, two or more pairs of nip rolls may each be independently disposed on the upstream side and the downstream side.

In addition, the vertical stretching of the polyester film may be performed by using a vertical stretching device including a nip roll.

In the vertical stretching step, an area stretching ratio (a product of each stretching ratio) of the polyester film is preferably 6 times to 18 times the area of the polyester film before being stretched, is more preferably 8 times to 17.5 times the area of the polyester film before being stretched, and is even more preferably 10 times to 17 times the area of the polyester film before being stretched.

When the glass transition temperature of the polyester film is set to Tg, the temperature at the time of vertically stretching the polyester film (hereinafter, also referred to as a "vertical stretching temperature") is preferably higher than or equal to Tg−20° C. and lower than or equal to Tg+50° C., is more preferably higher than or equal to Tg−10° C. and lower than or equal to Tg+40° C., and is even more preferably higher than or equal to Tg and lower than or equal to Tg+30° C.

When the polyester film is stretched by using a roll such as a nip roll as means for heating the polyester film, a heater or a pipe through which a hot solvent is able to flow is disposed in the roll, and thus it is possible to heat the polyester film which is in contact with the roll. In addition, even when the roll is not used, the polyester film is able to be heated by blowing hot air onto the film, by bringing the film into contact with a heat source such as a heater, or by allowing the film to pass through a region in the vicinity of the heat source.

In the present invention, the horizontal stretching step is included separately from the vertical stretching step. Therefore, the polyester film is stretched in the longitudinal direction (MD) of the film, and in a width direction (Transverse Direction (TD)) orthogonal to the longitudinal direction. Accordingly, a biaxially aligned film is obtained. The stretching in MD and TD may be performed at least one time, respectively.

Furthermore, the width direction (TD) orthogonal to the longitudinal direction (MD) of the film includes not only a direction perpendicular (at an angle of 90°) to the longitudinal direction (MD) of the polyester film, but also a direction approximately perpendicular (90°±5) to the longitudinal direction (MD) of the film, which is considered as being perpendicular to the longitudinal direction (MD) even when the direction is slightly shifted from 90° in consideration of a mechanical error or the like.

A biaxial stretching method may be either a sequentially biaxial stretching method in which the vertical stretching and the horizontal stretching are separately performed or a simultaneously biaxial stretching method in which the vertical stretching and the horizontal stretching are simultaneously performed.

The vertical stretching and the horizontal stretching may each be independently performed two or more times, and the sequence of the vertical stretching and the horizontal stretching is not particularly limited. Examples of the stretching sequence include Vertical Stretching→Horizontal Stretching, Vertical Stretching→Horizontal Stretching→Vertical Stretching, Vertical Stretching→Vertical Stretching→Horizontal Stretching, and Horizontal Stretching→Vertical Stretching. Among them, Vertical Stretching→Horizontal Stretching is preferable. Here, the arrow "→" described above indicates that the stretching on the left side of the arrow is performed, and then the stretching on the right side of the arrow is performed.

Next, the horizontal stretching step of the present invention will be described in detail.

~Horizontal Stretching Step~

The horizontal stretching step of the present invention is a step in which the vertically stretched polyester film is horizontally stretched in the width direction orthogonal to the longitudinal direction.

Example of the horizontal stretching step include a step performed by including a preheating portion in which the polyester film formed in the film forming step is preheated, a stretching portion in which the preheated polyester film is horizontally stretched by applying tension at least in the width direction orthogonal to the longitudinal direction, a thermal fixing portion in which the polyester film to which the tension is applied is thermally fixed by being heated and crystallized while controlling the highest film surface temperature of the surface of the polyester film such that the highest film surface temperature is in a range of higher than or equal to 210° C. and lower than or equal to 230° C., a thermal relaxing portion in which the thermally fixed polyester film is heated and the tension is relaxed, and a cooling portion in which the thermally relaxed polyester film is cooled.

In an arbitrary stage of these steps, a step is able to be included in which at least one surface of the polyester film is coated with a coating liquid, and thus a coating layer is formed on the polyester film.

The coating is able to be performed by an arbitrary known method. Examples of the coating method include a reverse roll coating method, a gravure coating method, a kiss coating method, a roll brush method, a spray coating method, an air knife coating method, a wire bar coating method, a pipe doctor method, and the like, and these methods are able to be independently applied or are able to be applied by being combined.

The step of applying the coating liquid may be a general coating step, that is, a step in which the coating liquid is applied onto the substrate film which has been biaxially stretched and thermally fixed, and it is preferable that the coating is performed during the step of producing the film. It is more preferable that the coating is performed with respect to a substrate film in which crystal alignment has not yet been completed.

Means for realizing the horizontal stretching step is not limited insofar as the polyester film is subjected to at least the horizontal stretching by the configuration described above, and it is preferable that the horizontal stretching is performed by using a horizontal stretching device or a biaxial stretching machine by which the treatment of the configuration described above is able to be performed.

In addition, in the horizontal stretching step, it is preferable that the polyester film which has passed through the thermal relaxing portion is cooled.

Hereinafter, the horizontal stretching step will be described in detail on the basis of the description of the biaxial stretching machine.

(Biaxial Stretching Machine)

Figure 1:
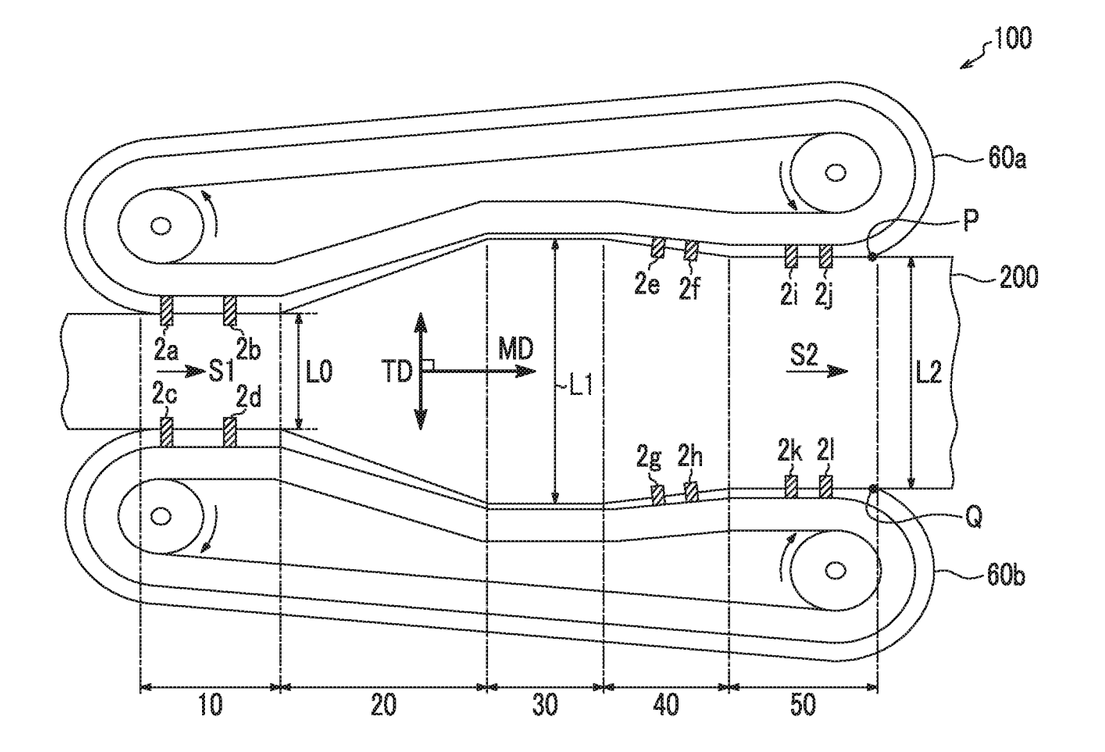
FIG. 1 is a schematic configuration diagram illustrating a biaxial stretching machine in a plan view.

FIG. 1 illustrates an example (a top view) of the biaxial stretching machine.

In FIG. 1, a biaxial stretching machine 100, and a polyester film 200 mounted on the biaxial stretching machine 100 are illustrated. The biaxial stretching machine 100 includes a pair of cyclic rails 60a and 60b which are symmetrically arranged by interposing the polyester film 200 therebetween.

The biaxial stretching machine 100 is divided into a preheating portion 10 in which the polyester film 200 is preheated, a stretching portion 20 in which the polyester film 200 is stretched in an arrow TD direction which is a direction orthogonal to an arrow MD direction, and thus tension is applied to the polyester film, a thermal fixing portion 30 in which the polyester film to which the tension is applied is heated in a state where the tension is applied to the polyester film, a thermal relaxing portion 40 in which the thermally fixed polyester film is heated and the tension of the thermally fixed polyester film is relaxed, and a cooling portion 50 in which the polyester film which has passed through the thermal relaxing portion is cooled.

The cyclic rail 60a includes at least gripping members 2a, 2b, 2e, 2f, 2i, and 2j which are able to be moved on the edge of the cyclic rail 60a, and the cyclic rail 60b includes at least gripping members 2c, 2d, 2g, 2h, 2k, and 2l which are able to be moved on the edge of the cyclic rail 60b. The gripping members 2a, 2b, 2e, 2f, 2i, and 2j grip one end portion of the polyester film 200 in the TD direction, and the gripping members 2c, 2d, 2g, 2h, 2k, and 2l grip the other end portion of the polyester film 200 in the TD direction. In general, the gripping members 2a to 2l are referred to as a chuck, a clip, and the like.

The gripping members 2a, 2b, 2e, 2f, 2i, and 2j are moved in a counterclockwise direction along the edge of the cyclic rail 60a, and the gripping members 2c, 2d, 2g, 2h, 2k, and 2l are moved in a clockwise direction along the edge of the cyclic rail 60b.

The gripping members 2a to 2d grip the end portion of the polyester film 200 in the preheating portion 10, and in this state, are moved on the edge of the cyclic rail 60a or 60b, and proceed to the cooling portion 50 indicated by the gripping members 2i to 2l through the thermal relaxing portion 40 indicated by the stretching portion 20 and the gripping members 2e to 2h. After that, the gripping members 2a and 2b, and the gripping members 2c and 2d are separated from the end portion of the polyester film 200 on the downstream side of the cooling portion 50 in the MD direction in sequence of the transport direction, and in this state, proceed along the edge of the cyclic rail 60a or 60b, and return to the preheating portion 10.

As a result thereof, the polyester film 200 is moved in the arrow MD direction of FIG. 1, and is sequentially transported to the preheating portion 10, the stretching portion 20, the thermal fixing portion 30, the thermal relaxing portion 40, and the cooling portion 50.

The moving speed of the gripping members 2a to 2l is the transport speed of the polyester film 200 in a gripping portion.

The gripping members 2a to 2l are each able to independently change moving speeds.

Accordingly, in the stretching portion 20, the biaxial stretching machine 100 is able to perform the horizontal stretching in which the polyester film 200 is stretched in the TD direction, and it is also possible to stretch the polyester film 200 in the MD direction by changing the moving speed of the gripping members 2a to 2l.

That is, it is possible to perform simultaneously biaxial stretching by using the biaxial stretching machine 100.

Only twelve gripping members 2a to 2l which grip the end portion of the polyester film 200 in the TD direction are illustrated in FIG. 1, but the biaxial stretching machine 100 include gripping members (not illustrated) in addition to the gripping members 2a to 2l in order to support the polyester film 200.

Furthermore, hereinafter, the gripping members 2a to 2l will be generally referred to as "gripping members 2".

Hereinafter, the preheating portion, the stretching portion, the thermal fixing portion, and the thermal relaxing portion will be described as an example of the horizontal stretching step.

(Preheating Portion)

In the preheating portion 10, the polyester film 200 is preheated. The polyester film 200 is heated in advance before being stretched, and thus the polyester film 200 is easily horizontally stretched.

When the glass transition temperature of the polyester film 200 is set to Tg, the film surface temperature (hereinafter, also referred to as a "preheating temperature") at the endpoint of the preheating portion is preferably Tg−10° C. to Tg+60° C., and is more preferably Tg° C. to Tg+50° C.

Furthermore, the endpoint of the preheating portion indicates a time point at which the preheating of the polyester film 200 ends, that is, a position in which the polyester film 200 is separated from a region of the preheating portion 10.

(Stretching Portion)

In the stretching portion 20, the preheated polyester film 200 is horizontally stretched at least in the direction (TD) orthogonal to the longitudinal direction (the transport direction, MD) to the polyester film 200, and thus tension is applied to the polyester film 200.

The stretching (the horizontal stretching) in the direction (TD) orthogonal to the longitudinal direction (the transport direction, MD) of the polyester film 200, as described above, indicates that the stretching is performed in the direction perpendicular (an angle of 90°) to the longitudinal direction (the transport direction, MD) of the polyester film 200, and may be a direction in a range of a mechanical error. The range of the mechanical error is a direction of an angle (90°±5°) which is considered as being perpendicular to the longitudinal direction (the transport direction, MD) of the polyester.

In the stretching portion 20, the tension (stretching tension) for horizontal stretching which is applied to the polyester film 200 is 0.1 t/m to 6.0 t/m.

In addition, an area stretching ratio of the polyester film 200 (a product of each stretching ratio) is preferably 6 times to 18 times, is more preferably 8 times to 17.5 times, and is even more preferably 10 times to 17 times the area of the polyester film 200 before being stretched.

In addition, when the glass transition temperature of the polyester film 200 is set to Tg, the film surface temperature (hereinafter, also referred to as a "horizontal stretching temperature") at the time of horizontally stretching the polyester film 200 is preferably higher than or equal to Tg−10° C. and lower than or equal to Tg+100° C., is more preferably higher than or equal to Tg° C. and lower than or equal to Tg+90° C., and is even more preferably higher than or equal to Tg+10° C. and lower than or equal to Tg+80° C.

As described above, the gripping members 2 (the gripping members 2a to 2l) are each able to independently change the moving speed, and for example, the moving speed of the gripping member 2 on the downstream side in the MD direction of the stretching portion 20 and the thermal fixing portion 30 is faster than the moving speed of the gripping member 2 in the preheating portion 10, and thus the vertical stretching in which the polyester film 200 is stretched in the transport direction (MD) is able to be performed together.

The vertical stretching of the polyester film 200 in the horizontal stretching step may be performed only in the stretching portion 20, or may be performed in the thermal fixing portion 30, the thermal relaxing portion 40, or the cooling portion 50 described below. The vertical stretching may be performed in a plurality of portions.

(Thermal Fixing Portion)

In the thermal fixing portion 30, the polyester film 200 to which the tension has been applied is heated, and is crystallized, and thus is thermally fixed. The thermal fixing indicates that the polyester film 200 is heated at a specific temperature while applying the tension to the polyester film 200 in the stretching portion 20.

In the present invention, the highest film surface temperature of the surface of the polyester film 200 is set to be in a range of higher than or equal to 210° C. and lower than or equal to 230° C. as the specific temperature.

The thermal fixing temperature described above is able to be measured by bringing the surface of the polyester film into contact with a thermocouple.

(Thermal Relaxing Portion)

In the thermal relaxing portion 40, the polyester film 200 is heated such that the highest film surface temperature of the surface of the polyester film 200 becomes a temperature lower than the highest film surface temperature ($T_{thermal\ fixing}$) of the polyester film 200 in the thermal fixing portion 30 by 5° C. or more, and thus the tension applied to the polyester film 200 is relaxed.

Hereinafter, the highest film surface temperature of the surface of the polyester film 200 at the time of performing the thermal relaxing will be also referred to as a "thermal relaxing temperature" ($T_{thermal\ relaxing}$).

In the thermal relaxing portion 40, the polyester film is heated at the thermal relaxing temperature ($T_{thermal\ relaxing}$) which is lower than the thermal fixing temperature ($T_{thermal\ fixing}$) by 5° C. or more ($T_{thermal\ relaxing} \leq T_{thermal\ fixing} - 5°$ C.), and the tension is relaxed (the stretching tension decreases), and thus it is possible to improve the dimensional stability of the polyester film.

When the thermal relaxing temperature ($T_{thermal\ relaxing}$) is a temperature higher than the "$T_{thermal\ fixing} - 5°$ C.", the expansion of the polyester molecules contracts in the relaxing step, and hydrolysis resistance of the polyester film decreases.

In contrast, when the thermal relaxing temperature ($T_{thermal\ relaxing}$) is lower than or equal to 100° C., it is difficult to contract the length between the molecular chains of the polyester molecules, and it is possible to make the dimensional stability excellent, and thus it is preferable that the thermal relaxing temperature ($T_{thermal\ relaxing}$) is higher than or equal to 100° C.

The thermal relaxing temperature ($T_{thermal\ relaxing}$) is preferably higher than or equal to 100° C. and is lower than the thermal fixing temperature ($T_{thermal\ fixing}$) by 15° C. or more (100° C. $\leq T_{thermal\ relaxing} \leq T_{thermal\ fixing} - 15°$ C.), is more preferably higher than or equal to 110° C. and lower than the thermal fixing temperature ($T_{thermal\ fixing}$) by 25° C. or more (110° C. $\leq T_{thermal\ relaxing} \leq T_{thermal\ fixing} - 25°$ C.), and is particularly preferably higher than or equal to 120° C. and lower than the thermal fixing temperature ($T_{thermal\ fixing}$) by 30° C. or more (120° C. $\leq T_{thermal\ relaxing} \leq T_{thermal\ fixing} - 30°$ C.).

Furthermore, the thermal relaxing temperature is able to be measured by bringing the surface of the polyester film 200 into contact with a thermocouple.

In addition, in the thermal relaxing portion 40, the relaxing is performed at least in the TD direction of the polyester film 200. According to such a treatment, the polyester film 200 to which the tension has been applied contracts in the TD direction.

The relaxing in the TD direction may weaken the stretching tension applied to the polyester film 200 in the stretching portion 20 by 2% to 90%. In the present invention, it is preferable that the stretching tension is weakened by 40%.

(Cooling Portion)

In the cooling portion 50, the polyester film 200 which has passed through the thermal relaxing portion 40 is cooled.

The polyester film 200 heated in the thermal fixing portion 30 or in the thermal relaxing portion 40 is cooled, and thus it is possible to fix the shape of the polyester film 200.

It is preferable that the film surface temperature of the polyester film 200 at a cooling portion outlet in the cooling portion 50 (hereinafter, also referred to as a "cooling temperature") is lower than the glass transition temperature Tg of the polyester film 200+50° C. Specifically, the cooling temperature is preferably 25° C. to 110° C., is more preferably 25° C. to 95° C., and is even more preferably 25° C. to 80° C.

According to the range described above, it is possible to prevent the film from inhomogeneously contracting after releasing clip gripping.

Here, the cooling portion outlet indicates the end portion of the cooling portion 50 at the time of separating the polyester film 200 from the cooling portion 50, and indicates a portion at the time of separating the gripping member 2 (in FIG. 1, the gripping members 2j and 2l) gripping the polyester film 200 from the polyester film 200.

Furthermore, in the preheating, the stretching, the thermal fixing, the thermal relaxing, and the cooling of the horizontal stretching step, hot air or cool air is blown onto the polyester film 200, the polyester film 200 is in contact with the surface of a metal plate which is able to control the temperature, or the polyester film 200 passes through a region in the vicinity of the metal plate as temperature control means for heating or cooling the polyester film 200.

(Recovery of Film)

The gripping portions of the cooled polyester film 200 on both ends in the TD direction are cut, and the polyester film 200 is wound into the shape of a roll.

In the horizontal stretching step, in order to further increase hydrolysis resistance and dimensional stability of the polyester film to be produced, it is preferable that the stretched polyester film is relaxed by the following method.

As described above, it is preferable that the horizontal stretching step is performed after the vertical stretching step.

Thus, when the horizontal stretching step is performed after then vertical stretching step, and then the relaxing in the MD direction is performed in the cooling portion 50, the steps are able to be performed as follows.

First, in the preheating portion 10, one end portion of both end portions of the polyester film 200 in the width direction (TD) is gripped by using at least two gripping members. For example, one end portion of both end portions of the polyester film 200 in the width direction (TD) is gripped by the gripping members 2a and 2b, and the other end portion is gripped by the gripping members 2c and 2d. Next, the polyester film 200 is transported from the preheating portion 10 to the cooling portion 50 by moving the gripping members 2a to 2d.

In the transporting, an interval between the gripping member 2a (2c) (one gripping member of the two gripping members) gripping the one end portion of the polyester film 200 in the width direction (the TD direction) and the other gripping member 2b (2d) (the other gripping member of the two gripping members) adjacent to the gripping member 2a (2c) in the preheating portion 10 is narrower than an interval between the gripping member 2a (2c) (one gripping member of the two gripping members) gripping the one end portion of the polyester film 200 in the width direction and the other gripping member 2b (2d) (the other gripping member of the two gripping members) adjacent to the gripping member 2a (2c) in the cooling portion 50, and thus the transport speed of the polyester film 200 decreases. According to such a method, it is possible to perform the relaxing in the MD direction in the cooling portion 50.

The relaxing of the polyester film 200 in the MD direction is able to be performed in at least a part of the thermal fixing portion 30, the thermal relaxing portion 40, and the cooling portion 50.

As described above, the intervals between the gripping members 2a-2b and the intervals between the gripping members 2c-2d are narrower on the upstream side in the MD direction than on the downstream side, and thus it is possible to perform the relaxing of the polyester film 200 in the MD direction. Accordingly, in a case where the relaxing in the MD direction is performed in the thermal fixing portion 30 or in the thermal relaxing portion 40, when the gripping members 2a to 2d reach the thermal fixing portion 30 or the thermal relaxing portion 40, the moving speed of the gripping members 2a to 2d becomes slow, and the transport speed of the polyester film 200 decreases, and thus the interval between the gripping members 2a-2b and the interval between the gripping members 2c-2d are may be narrower than the interval in the preheating portion.

Thus, in the horizontal stretching step, the stretching in the MD direction (the vertical stretching) and the relaxing in the MD direction are performed along with the stretching of the polyester film 200 in the TD direction (the horizontal stretching) and the relaxing in the TD direction, and thus it is possible to enhance the dimensional stability.

<Optical Sheet>

An optical sheet of the present invention includes the biaxially stretched polyester film of the present invention described above. Further, the optical sheet is able to include the biaxially stretched polyester film, and an easily adhesive layer which is disposed on at least one surface of the biaxially stretched polyester film, and contains at least one type of resin selected from a polyester resin, a urethane resin, an acrylic resin, and a melamine resin in the amount of greater than or equal to 50 mass %.

The optical sheet of the present invention is provided with the biaxially stretched polyester film of the present invention described above, and thus the coloration is small, the transparency is excellent, and for example, is suitable for application of an optical sheet such as a prism lens sheet.

Examples of other applications include various applications of a base film such as a prism sheet, a light diffusing sheet, a reflection plate, and a touch panel of a member of an LCD, a base film for preventing reflection, a base film for preventing display explosion, a film for a plasma display panel (PDP) filter, and the like.

In order to obtain adhesiveness with respect to a acrylate-based resin used in a prism lens or hard coat, the easily adhesive layer is able to be formed as a polymer layer in which one type or resin or two or more types of resins selected from a polyester resin, a urethane resin, an acrylic resin, and a melamine resin are contained in the amount of greater than or equal to 50 mass % with respect to the entire layer, that is, as a main component.

The description in paragraphs "0043" to "0088" of JP4023219B is able to be applied to the details of the easily adhesive layer.

The easily adhesive layer is able to be formed by applying an aqueous coating liquid which contains a resin selected from a polyester resin, a urethane resin, an acrylic resin, and a melamine resin as a main component onto the desired biaxially stretched polyester film described above. The aqueous coating liquid is applied, for example, by a known coating method such as a reverse roll coating method, a gravure coating method, a kiss coating method, a roll brush method, a spray coating method, an air knife coating method, a wire bar coating method, a pipe doctor method, an impregnation coating method, and a curtain coating method.

The coating of the aqueous coating liquid may be performed by using a general coating step, that is, a coating step in which the aqueous coating liquid is applied onto the film which has been biaxially stretched and thermally fixed, and it is preferable that the coating is performed during the step of producing the film. It is more preferable that the coating is performed with respect to a film in which crystal alignment has not yet completed.

The concentration of solid contents of an aqueous solution is generally less than or equal to 30 mass %, and is preferably less than or equal to 10 mass %. Here, the coating amount of the aqueous coating liquid is preferably 0.04 g to 5 g, and is more preferably 0.2 g to 4 g, per 1 $m^2$ of the film.

EXAMPLES

Hereinafter, the present invention will be more specifically described by examples, but the present invention is not limited to the following examples unless departing from the gist of the present invention. Furthermore, unless otherwise particularly stated, "part" is on a mass basis.

<Synthesis of Polyester Raw Material>

As described below, polyester was obtained by a direct esterification method in which a terephthalic acid (TPA) directly reacted to ethylene glycol (EG), water was distilled, esterification was performed, and then polycondensation was performed under reduced pressure using a continuous polymerization device.

(1) Esterification Reacting Step 4.7 tons of a high purity terephthalic acid (TPA) and 1.8 tons of ethylene glycol (EG) were mixed for 90 minutes, and thus a slurry was prepared, and was continuously supplied to the beginning esterification reactor (a first esterification reactor) at a flow rate of 3800 kg/h. Further, antimony trioxide ($Sb_2O_3$) was supplied thereto, and a reaction was performed under the following conditions.

At this time, $Sb_2O_3$ was continuously supplied such that the amount of $Sb_2O_3$ was 150 ppm in a Sb element conversion value. At this time, the acid value of the obtained oligomer was 1200 eq/ton.

<Conditions>

Temperature in Reactor: 250° C.

Average Retention Time: approximately 4.3 hours

The reactant was transported to the next esterification reactor (a second esterification reactor), an ethylene glycol solution of magnesium acetate was continuously supplied thereto such that the added amount of Mg was 40 ppm in a Mg element conversion value, and a reaction was performed under the following conditions.

<Conditions>

Temperature in Reactor: 250° C.

Average Retention Time: 1.2 hours

Subsequently, the reactant was transported to the final esterification reactor (a third esterification reactor), an ethylene glycol solution of phosphate trimethyl (TMPA) was continuously supplied thereto such that the amount of phosphorus was 35 ppm in a phosphorus element conversion value, a reaction was performed under the following conditions, and thus an oligomer having an acid value of 400 eq/ton was obtained.

<Conditions>

Temperature in Reactor: 250° C.

Average Retention Time: 1.2 hours (2) Polycondensation Reacting Step

The esterification reaction product obtained as described above was continuously supplied to the beginning polycondensation reactor (the first polycondensation reactor), and polycondensation was performed under the following conditions.

<Conditions>
Reaction Temperature: 270° C.
Pressure in Reactor: $2.67 \times 10^3$ Pa
Average Retention Time: 1.8 hour Next, the esterification reaction product obtained as described above was continuously supplied to the next polycondensation reactor (the second polycondensation reactor), and polycondensation was performed under the following conditions.

<Conditions>
Temperature in Reactor: 275° C.
Pressure in Reactor: $0.27 \times 10^3$ Pa
Retention Time: 1.0 hour Next, the esterification reaction product obtained as described above was continuously supplied to the final polycondensation reactor (the third polycondensation reactor), polycondensation was performed under the following conditions, and thus polyethylene terephthalate (PET) was obtained.

<Conditions>
Temperature in Reactor: 280° C.
Pressure in Reactor: $0.17 \times 10^3$ Pa
Retention Time: 1.5 hour Next, the obtained PET was ejected to cold water in the shape of a strand, was directly cut, and thus a PET pellet (a sectional surface: a long diameter of approximately 4 mm, a short diameter of approximately 2 mm, and a length of approximately 3 mm) was prepared.

The obtained PET was measured as follows by using a high-resolution type high-frequency inductively-coupled plasma-mass analyzer (HR-ICP-MS; AttoM, manufactured by Hitachi High-Tech Science Corporation), and as a result thereof, Sb was 130 ppm, Mg was 40 ppm, and P was 35 ppm.

IV, AV, the amount of DEG, melting resistivity, and a b value were obtained by the following method using the PET pellet obtained as described above.

(i) IV

The PET pellet was dissolved in a mixed solvent of 1,1,2,2-tetrachloroethane/phenol (=2/3 [mass ratio]), relative viscosity ηo at 25° C. was measured by using an Ubbelohde type viscosity tube, ηsp/C was obtained from specific viscosity (ηsp) which was obtained from the relative viscosity and a concentration C, and intrinsic viscosity (IV) was calculated by a three-point method.

(ii) AV

The PET pellet was completely dissolved in a mixed solution of benzyl alcohol/chloroform (=2/3; a volume ratio), titration was performed with a reference liquid (0.025 N KOH-methanol mixed solution) by using phenol red as an indicator, and AV was calculated from the titration amount.

(iii) Amount of DEG

The PET pellet was subjected to freeze pulverization with liquid nitrogen, and 2 g of the PET pellet was weighed and was dissolved (hydrolyzed) in 50 ml of a 0.75N NaOH/methanol solution while being refluxed in a bath at 80° C. After that, the PET pellet was neutralized by a terephthalic acid, and then the terephthalic acid was filtered, and a filtrate was injected to a gas chromatography (GC), and thus the content of DEG was measured.

(Iv) Melting Resistivity 15 g of the PET pellet was put into a test tube and was melted in an oil bath at 290° C., two electrodes (stainless steel wire) were inserted into the melted polyester, a current ($I_o$) at the time of applying a voltage of 120 V was measured, a resistivity value Si was obtained from the following expression, and evaluation was performed according to the following criteria. The evaluation of higher than or equal to "C" is in an allowable range.

$$Si\ (\Omega \cdot cm)=(A/L) \times (V/I_o)$$

[A: Area between Electrodes ($cm^2$), L=Distance between Electrode (cm), V=Voltage (V)]

<Criteria>
A: $Si < 0.10 \times 10^8$
B: $0.10 \times 10^8 \leq Si < 0.25 \times 10^8$
C: $0.25 \times 10^8 \leq Si < 0.40 \times 10^8$
D: $Si \geq 0.40 \times 10^8$ (v) b Value The b value was measured with respect to the PET pellet by using ND-101D (manufactured by Nippon Denshoku Industries Co., Ltd.), and evaluation was performed according to the following criteria. The evaluation of higher than or equal to "C" is in an allowable range.

<Criteria>
A: b Value<0.5
B: 0.5≤b Value<2.0
C: 2.0≤b Value<3.5
D: b Value≥3.5

<Production of Biaxially Stretched Polyester Film>

The PET pellet obtained in the melting polymerization step described above was dried at 135° C. for 6 hours under reduced pressure, and then was supplied to an extruder, was extruded into the shape of a film at approximately 290° C., and was adhesively solidified by a rotational cooling roll at 25° C., and thus an unstretched PET film was obtained.

The obtained unstretched polyester film was subjected to sequentially biaxial stretching by the following method, and was stretched as follows, and thus a biaxially stretched polyester film 1 having a thickness of 188 μm was obtained.

—Vertical Stretching Step—

The unstretched polyester film passed through two pairs of nip rolls having different rotation speeds, and was stretched in a vertical direction (a transport direction) under the following conditions.

Then, a coating liquid A described below was subjected to precision filtration by a filter material having a filtration particle size of 10 μm, the coating liquid after the filtration was applied onto both surfaces of a monoaxially aligned PET film which was obtained by being vertically stretched such that the final coating amount after drying (the coating amount after the biaxial stretching) was 0.1 mg/m² by a roll coating method.

<Conditions>
Vertical Stretching Temperature: 95° C.
Vertical Stretching Ratio: 3.5 times <Coating Liquid A>

The following compositions were mixed, and thus the coating liquid A was prepared.

—Compositions—
Water . . . 50 parts by mass
Isopropanol . . . 31 parts by mass
Aqueous Solution A-1 of Polycarbonate-Based Polyurethane Resin Described below . . . 13 parts by mass
Aqueous Solution B-1 of Resin Having Oxazoline Group Described below . . . 4 parts by mass Particles (Silica Sol Having Average Particle Diameter of 40 nm, and Concentration of Solid Contents: 40 mass %) . . . 1 part by mass Fluorine-Based Surfactant (Concentration of Solid Contents of 10 mass %) . . . 1 part by mass —Synthesis of Polycarbonate-Based Urethane Resin A-1—

627.1 parts of hexamethylene diisocyanate and 372.9 parts of methoxy polyethylene glycol having a number average molecular weight of 1000 which was heated at 50° C. were put into a reaction device including a thermometer, a nitrogen gas introduction pipe, and a stirrer while introducing nitrogen gas thereto, and a reaction was performed at 80° C. for 6 hours. After a predetermined content of an isocyanate group was obtained, unreacted hexamethylene diisocyanate was removed in a Smith type thin film still, and thus a polyoxy ethylene chain-containing monoisocyanate a was obtained. Next, 83.9 parts of diethanol amine was put into a reaction device including a thermometer, a nitrogen gas introduction pipe, and a stirrer at room temperature while introducing nitrogen gas thereto. 916.1 parts of the polyoxy ethylene chain-containing monoisocyanate a was added to the reactor while being cooled, and a reaction was performed at 60° C. for 3 hours. It was confirmed that a urea bond was generated by an infrared spectrum, and a polyoxy ethylene side chain-containing polyol A was obtained. 53.7 parts of 1,3-cyclohexane bis(methyl isocyanate), 88.6 parts of polyhexane diol carbonate having a number average molecular weight of 2000, 15.0 parts of neopentyl glycol, and 52.9 parts of the polyoxy ethylene side chain-containing polyol A as polyisocyanate, and 60 parts of acetonitrile and 30 parts of N-methyl pyrrolidone as an organic solvent were put into a four-neck flask including a reflux cooling pipe, a nitrogen introduction pipe, a thermometer, and a stirrer, the temperature of a reaction liquid was adjusted to be 75° C. to 78° C. under a nitrogen atmosphere, 0.06 parts of tin(I) octylate (tin(I) 2-ethylhexanoate) (manufactured by Nacalai Tesque, Inc.) was added to the reactor as a reaction catalyst, and a reaction was performed at a reaction ratio of greater than or equal to 99% for 7 hours. Next, the reactant was cooled to 30° C., and thus an isocyanate group terminal prepolymer was obtained. Next, 450 g of water was added to a reaction vessel including a homodisper in which high speed stirring was able to be performed, the temperature was adjusted to be 25° C., the isocyanate group terminal prepolymer was added thereto while being stirred and mixed at 2000 $min^{-1}$, and water dispersion was performed. After that, a part of acetonitrile and water was removed under reduced pressure. Thus, an aqueous solution A-1 of a polycarbonate-based urethane resin having a solid content of 35 mass/% was prepared.

—Synthesis of Resin B-1 Having Oxazoline Group—

460.6 parts of isopropyl alcohol was put into a flask including a stirrer, a reflux cooler, a nitrogen introduction pipe, and a thermometer, and was heated to 80° C. while gradually allowing nitrogen gas to flow therethrough. A monomer mixture formed of 126 parts of methyl methacrylate, 210 parts of 2-isopropenyl-2-oxazoline, and 84 parts of methoxy polyethylene glycol acrylate, which was prepared in advance, and an initiator solution formed of 21 parts of ABN-E (polymerization initiator: 2,2'-azobis(2-methyl butyronitrile), manufactured by Japan Finechem Inc.) and 189 parts of isopropyl alcohol were respectively dripped into the flask by a dripping funnel for 2 hours. The nitrogen gas continuously flowed through the flask during the reaction, and the temperature in the flask was maintained to be 80±1° C. After the dripping, the flask was maintained at the same temperature for 5 hours and then was cooled, and thus a resin B-1 having an oxazoline group was obtained. The oxazoline value of the obtained resin B-1 having an oxazoline group was 220 g-solid/eq.

—Horizontal Stretching Step—

The polyester film 1 which had been vertically stretched (a vertically stretched polyester film 1) was stretched under the following conditions by using a tenter (a biaxial stretching machine) having a structure illustrated in FIG. 1.

(Preheating Portion)

Preheating Temperature: 110° C.

(Stretching Portion)

Stretching Temperature (Horizontal Stretching Temperature): 130° C.

Stretching Ratio (Horizontal Stretching Ratio): 4.0 times (Thermal Fixing Portion)

Thermal Fixing Temperature: Thermally fixing temperature [° C.] set to be Tmeta shown in Table 1

(Thermal Relaxing Portion)

Relaxing Ratio: Horizontal direction (ΔL): 3 [%] Vertical Direction (ΔS): 0 [%]

(Cooling Portion)

Cooling Temperature: 65 [° C.]

(Recovery of Film)

Both ends of the polyester film 1 were trimmed by 20 cm after the thermal relaxing. After that, extrusion processing (knurling) was performed with respect to the both ends with a width of 10 mm, and then the polyester film 1 was wound.

As described above, a biaxially stretched polyester film (PET film) 1 having a thickness of 188 μm was produced.

The thickness of the obtained biaxially stretched polyester film 1 was measured by using a contact type film thickness measuring meter (manufactured by Anritsu Corporation), 50 points were sampled at equal intervals over 0.5 m in a longitudinal direction, and 50 points were sampled at equal intervals over the entire width of the film formation in a width direction (divided into 50 equal points in the width direction), and the thicknesses of the 100 points were measured. The average thickness of the thicknesses of the 100 points was obtained, and was set to the average thickness of the film. The thickness of the biaxially stretched polyester film 1 is shown in Table 1 described below.

In the biaxially stretched polyester film 1 produced as described above, spectral transmittance, haze, and the amount of metal antimony (a particle concentration) were obtained by the following method. The results are shown in Table 1 described below. Furthermore, in Table 1, the numerical values in a section of "Metal Sb Content" are the amount per 1 kg of polyester (unit: mg).

(vi) Spectral Transmittance 3 g of a biaxially stretched polyester film was dissolved in 15 ml of hexafluoroisopropanol (hereinafter, referred to as HFIP), the HFIP solution was put into a quartz cell having a thickness of 2 mm. A ratio (%) of the amount of transmission ray to the amount of incidence ray of light having a wavelength of 450 nm which had been incident on the cell was obtained by using UV-visible spectrophotometer (UV-2450, manufactured by Shimadzu Corporation). The spectral transmittance was evaluated from the ratio according to the following criteria.

<Criteria>

A: Greater than or equal to 99.0%

B: Greater than or equal to 98.5 and less than 99.0

C: Greater than or equal to 98.0 and less than 98.5

D: Less than 98.0

(vii) Haze

In a HFIP solution of a polyester film prepared as described above, diffuse transmittance, the total light transmittance was measured by using a haze meter (NDH2000, manufactured by Nippon Denshoku Industries Co., Ltd.), and the haze was obtained from the following expression. The haze was evaluated by using the value of the haze as an index according to the following criteria.

Haze (%)=$Td/Tt$×100

[Td: Diffuse Transmittance, and Tt: Total Light Transmittance]

<Criteria>
A: Haze≤0.5
B: 0.5<Haze≤0.65
C: 0.65<Haze≤0.8
D: Haze>0.8

(viii) Concentration of Metal Antimony in Residues

A HFIP solution of a polyester film prepared as described above was filtered by a water flow type suction filtration method (a suction pressure of 3 kPa to 4 kPa) using a membrane filter of hydrophilic polytetrafluoroethylene having an average pore diameter of 0.1 μm (Omnipore, manufactured by EMD Millipore Corporation). The residues on the filtration filter were dissolved in $HNO_3$, and the amount of Sb was obtained using a high-resolution type high-frequency inductively-coupled plasma-mass analyzer (HR-ICP-MS; AttoM, manufactured by Hitachi High-Tech Science Corporation).

(ix) Temperature Falling Crystallization Temperature (Tc')

10 mg of a film sample was put into an aluminum pan, the film sample was heated from room temperature to 300° C. at a temperature rising rate of 20° C./minute, was maintained for 2 minutes after the temperature reached 300° C., and then was cooled to 100° C. at a temperature falling speed of 10° C./minute, and the peak temperature of an exothermic peak generated in a cooling process was measured as a temperature falling crystallization temperature (Tc').

(x) Adhesiveness

—Preparation of Coating Liquid—

Components in the following compositions were mixed, and thus a coating liquid was prepared.

<Compositions>
Water . . . 51.00 mass %
Isopropanol . . . 30.00 mass %
Polyurethane Resin (A-1) . . . 12.58 mass %
Resin (B) Having Oxazoline Group . . . 4.72 mass %
Particles (Silica Sol Having Average Particle Diameter of 40 nm, and Concentration of Solid Contents: 40 mass %) . . . 1.57 mass %
Particles (Silica Sol Having Average Particle Diameter of 450 nm, and Concentration of Solid Contents: 40 mass %) . . . 0.08 mass %
Surfactant (Silicon-Based, and Concentration of Solid Contents: 100 mass %) . . . 0.05 mass %

—Production of Easily Adhesive Optical Polyester Film—

The coating liquid described above was applied onto one surface of an unstretched polyester film (an unstretched polyester film 1) by a roll coating method, and then was dried at 80° C. for 20 seconds. At this time, the coating amount after drying was adjusted to be 0.15 g/m². Subsequently, sequentially biaxial stretching was performed by the method described above, and thus a biaxially stretched polyester film 2 was obtained.

—Production of Optical Laminated Polyester Film—

Next, approximately 5 g of a photocurable acryl-based coating liquid described below was applied onto an SUS plate (SUS304) having a thickness of 1 mm which has been kept clean, and the biaxially stretched polyester film 2 and the SUS plate were superposed such that the coating surface of the biaxially stretched polyester film 2 was in contact with the photocurable acryl-based coating liquid, and were press-attached to each other such that the photocurable acryl-based coating liquid spread on the biaxially stretched polyester film 2 by a manual load rubber roller having a width of 10 cm and a diameter of 4 cm.

Next, an ultraviolet ray of 800 mJ/cm² was applied to the photocurable acryl-based coating liquid from the biaxially stretched polyester film 2 side by using a high pressure mercury lamp, and thus the photocurable acrylic resin was cured. The biaxially stretched polyester film 2 including a photocurable acrylic layer having a thickness of 20 μm was peeled off from the SUS plate, and thus a laminated polyester film was prepared.

<Photocurable Acryl-Based Coating Liquid>

The following components were mixed, and thus a coating liquid was obtained.

Photocurable Acrylic Resin (Beamset 505A-6, manufactured by Arakawa Chemical Industries, Ltd.) . . . 54.00 mass %
Photocurable Acrylic Resin (Beamset 550, manufactured by Arakawa Chemical Industries, Ltd.) . . . 36.00 mass %
Photopolymerization Initiator (Irgacure 184, manufactured by BASF SE) . . . 10.00 mass %

—Adhesion Evaluation—

100 grid-like cuts, which reached the polyester film through the photocurable acrylic layer, were formed on the surface of the photocurable acrylic layer of the obtained laminated polyester film by using a cutter guide having a gap interval of 2 mm, a cellophane pressure sensitive tape (manufactured by Nichiban Co., Ltd., No. 405; a width of 24 mm) was bonded onto the surface of the grid-like cuts, and then adhered thereto by being rubbed with an eraser. After that, an operation in which the cellophane pressure sensitive tape was pulled in a direction perpendicular to the film surface, and the cellophane pressure sensitive tape was peeled off from the surface of the photocurable acrylic layer of the laminated polyester film was performed one time. After that, the number of grids peeled off from the surface of the photocurable acrylic layer of the laminated polyester film was visually observed, adhesiveness between the photocurable acrylic layer and the polyester film was obtained from the following expression, and evaluation was performed according to the following criteria.

Furthermore, in the grids, the grid which was partially peeled off was considered as the peeled-off grid, and the ranking was prepared by the following criteria.

Adhesiveness (%)=(1−Number of peeled-off grids/100)×100

<Criteria>
A: 100% or Breakdown in Material of Photocurable Acrylic Layer
B: 99% to 90%
C: 89% to 80%
D: 79% to 0%

Examples 2 to 10, and Comparative Examples 1 to 2

In Example 1, a PET pellet and a biaxially stretched polyester film were produced by the same method as that in Example 1 except that the added additives in the esterification reacting step or the pressure in the polycondensation reacting step was changed as shown in Table 1 described below, and measurement and evaluation were performed. The results are shown in Table 1 described below.

TABLE 1

|  |  |  | Example 1 | Example 2 | Comparative Example 1 | Comparative Example 2 | Example 3 | Example 4 |
|---|---|---|---|---|---|---|---|---|
| Esterification Reaction | First Reactor | Raw Material | TPA/EG | TPA/EG | TPA/EG | TPA/EG | TPA/EG | TPA/EG |
|  |  | Catalyst | Sb2O3 | Sb2O3 | Sb2O3 | Sb2O3 | Sb2O3 | Sb2O3 |
|  |  | Additive |  |  |  |  |  |  |
|  | Second Reactor | Additive | Mg Acetate | Mg Acetate | Mg Acetate | Mg Acetate | Mg Acetate | Mg Acetate |
|  |  |  | EG | EG | EG | TMPA | EG | EG |
|  | Third Reactor | Additive | TMPA | TMPA | TMPA | TMPA | TMPA | TMPA |
| Polycondensation Reaction | First Reactor | Pressure [Pa] ($\times 10^3$) | 2.67 | 4.67 | 6.67 | 2.67 | 2.67 | 2.67 |
|  |  | Retention Time [h] | 1.8 | 1.8 | 1.8 | 1.8 | 1.8 | 1.8 |
|  |  | Temperature [°C.] | 270 | 270 | 270 | 270 | 270 | 270 |
|  | Second Reactor | Pressure [Pa] ($\times 10^3$) | 0.27 | 0.47 | 0.67 | 0.27 | 0.27 | 0.27 |
|  |  | Retention Time [h] | 1.0 | 1.0 | 1.0 | 1.0 | 1.0 | 1.0 |
|  |  | Temperature [°C.] | 275 | 275 | 275 | 275 | 275 | 275 |
|  | Third Reactor | Pressure [Pa] ($\times 10^3$) | 0.17 | 0.13 | 0.09 | 0.17 | 0.17 | 0.17 |
|  |  | Retention Time [h] | 1.5 | 1.5 | 1.5 | 1.5 | 1.5 | 1.5 |
|  |  | Temperature [°C.] | 280 | 280 | 280 | 280 | 280 | 280 |
| Polymer | Mg Content | ppm | 40 | 40 | 40 | 40 | 40 | 40 |
|  | P Content | ppm | 35 | 35 | 35 | 35 | 35 | 35 |
|  | Sb Content | ppm | 130 | 130 | 130 | 130 | 130 | 130 |
|  | IV | — | 0.650 | 0.650 | 0.650 | 0.650 | 0.650 | 0.650 |
|  | Terminal COOH | eq/ton | 25 | 25 | 25 | 25 | 25 | 25 |
|  | Pellet b Value | — | 0.7/B | 2.7/C | 4.5/D | 1.3/B | 0.7/B | 0.7/B |
|  | Melting Resistivity | $\times 10^8$ Ω·m | B | B | B | D | B | B |
| Film Evaluation | Thickness | μm | 188 | 188 | 188 | 188 | 188 | 188 |
|  | Tmeta | °C. | 220 | 220 | 220 | 220 | 207 | 233 |
|  | DEG | mol % | 1.3 | 1.3 | 1.3 | 1.3 | 1.3 | 1.3 |
|  | Tc | °C. | 190 | 200 | 185 | 175 | 190 | 190 |
|  | Haze (*HFIP Solution) |  | 0.50/A | 0.75/C | 0.81/D | 0.52/B | 0.40/A | 0.65/B |
|  | Spectral Transmittance (450 nm) (*HFIP Solution) | % | 99.0/A | 98.2/C | 97.8/D | 98.8/B | 99.4/A | 98.5/B |
|  | Metal Sb Content | mg | 20 | 90 | 110 | 0.3 | 20 | 20 |
|  | Adhesiveness Evaluation |  | B | B | B | D | C | A |

|  |  |  | Example 5 | Example 6 | Example 7 | Example 8 | Example 9 | Example 10 |
|---|---|---|---|---|---|---|---|---|
| Esterification Reaction | First Reactor | Raw Material | TPA/EG | TPA/EG | TPA/EG | TPA/EG | TPA/EG | TPA/EG |
|  |  | Catalyst | Sb2O3 | Sb2O3 | Sb2O3 | Sb2O3 | Sb2O3 | Sb2O3 |
|  |  | Additive |  |  |  |  |  |  |
|  | Second Reactor | Additive | Mg Acetate | Mg Acetate | Mg Acetate | Mg Acetate | Mg Acetate | Mg Acetate |
|  |  |  | EG | EG | EG | EG | EG | EG |
|  | Third Reactor | Additive | TMPA | TMPA | TMPA | TMPA | TMPA | TMPA |
| Polycondensation Reaction | First Reactor | Pressure [Pa] ($\times 10^3$) | 2.67 | 2.67 | 2.67 | 2.67 | 2.67 | 2.67 |
|  |  | Retention Time [h] | 1.8 | 1.8 | 1.8 | 1.8 | 1.8 | 1.8 |
|  |  | Temperature [°C.] | 270 | 270 | 270 | 270 | 270 | 270 |
|  | Second Reactor | Pressure [Pa] ($\times 10^3$) | 0.27 | 0.27 | 0.27 | 0.27 | 0.27 | 0.27 |
|  |  | Retention Time [h] | 1.0 | 1.0 | 1.0 | 1.0 | 1.0 | 1.0 |
|  |  | Temperature [°C.] | 275 | 275 | 275 | 275 | 275 | 275 |
|  | Third Reactor | Pressure [Pa] ($\times 10^3$) | 0.17 | 0.17 | 0.17 | 0.17 | 0.17 | 0.17 |
|  |  | Retention Time [h] | 1.5 | 1.5 | 1.5 | 1.5 | 1.5 | 1.5 |
|  |  | Temperature [°C.] | 280 | 280 | 280 | 280 | 280 | 280 |
| Polymer | Mg Content | ppm | 40 | 40 | 40 | 40 | 18 | 65 |
|  | P Content | ppm | 35 | 35 | 18 | 43 | 35 | 35 |
|  | Sb Content | ppm | 130 | 130 | 130 | 130 | 130 | 130 |
|  | IV | — | 0.650 | 0.650 | 0.650 | 0.650 | 0.650 | 0.650 |
|  | Terminal COOH | eq/ton | 25 | 25 | 25 | 25 | 25 | 25 |
|  | Pellet b Value | — | 0.7/B | 0.7/B | 2.5/C | 0.4/A | 0.3/A | 3.4/C |
|  | Melting Resistivity | $\times 10^8$ Ω·m | B | B | A | C | C | B |
| Film Evaluation | Thickness | μm | 188 | 188 | 188 | 188 | 188 | 188 |
|  | Tmeta | °C. | 220 | 220 | 220 | 220 | 220 | 220 |
|  | DEG | mol % | 0.9 | 1.7 | 1.1 | 1.4 | 1.5 | 1.0 |
|  | Tc | °C. | 200 | 180 | 195 | 187 | 185 | 197 |
|  | Haze (*HFIP Solution) |  | 0.54/B | 0.45/A | 0.64/B | 0.60/B | 0.59/B | 0.62/B |
|  | Spectral Transmittance (450 nm) (*HFIP Solution) | % | 98.6/B | 99.2/A | 98.4/C | 98.3/C | 98.3/C | 98.5/B |

TABLE 1-continued

| | | | | | | | |
|---|---|---|---|---|---|---|---|
| Metal Sb Content | mg | 20 | 20 | 20 | 20 | 20 | 20 |
| Adhesiveness Evaluation | | B | C | B | C | C | B |

As shown in Table 1 described above, in the examples, metal antimony was able to be contained in the film in a range where the content of metal antimony was neither excessively small nor excessively large, and the produced film had low haze, excellent transparency, and excellent adhesiveness with respect to the adjacent layer.

In contrast, in Comparative Example 1, the pressure in the polycondensation reacting step was high, the content of the metal antimony educed due to reducing gas which was generated by thermal decomposition of ethylene glycol excessively increased, and in the content of the metal antimony, the adhesiveness did not deteriorate, but the haze deteriorated, and thus the optical transmittance deteriorated. In contrast, in Comparative Example 2 where the content of the metal antimony is excessively small, the haze was low and the optical transmittance was excellent, but excellent adhesiveness with respect to the adjacent layer was not obtained.

INDUSTRIAL APPLICABILITY

A biaxially stretched polyester film and a method for producing the biaxially stretched polyester film of the present invention are suitable for application of an optical film (for example, a prism lens sheet).

Priority is claimed on Japanese Patent Application No. 2013-152970, filed on Jul. 23, 2013, the content of which is incorporated herein as a part by reference.

All of the literature, patent applications, and technical standards disclosed herein are incorporated herein by reference in the same degree as that of a case where the literature, patent applications, and technical standards are specifically and individually incorporated herein by reference.

What is claimed is:

1. A biaxially stretched polyester film containing an antimony compound as a catalyst component, and a magnesium compound and a phosphorus compound as additives,
    wherein an amount of metal antimony included in residues on a membrane filter having an average pore diameter of 0.1 μm, after a solution in which 1 g of the biaxially stretched polyester is dissolved in 5 ml of hexafluoroisopropanol is filtered by the filter, is 10 to 100 mg per 1 kg of the biaxially stretched polyester.

2. The biaxially stretched polyester film according to claim 1,
    wherein a micro heat absorption peak temperature Tmeta (° C.) of the biaxially stretched polyester film obtained by differential scanning calorimetry (DSC) satisfies the following Expression 1:

$$210° C. \leq Tmeta \leq 230° C. \quad \text{(Expression 1)}.$$

3. The biaxially stretched polyester film according to claim 1,
    wherein the biaxially stretched polyester film contains diethylene glycol, and a content of the diethylene glycol is from 1.0 mol % to 1.5 mol %.

4. The biaxially stretched polyester film according to claim 1,
    wherein the biaxially stretched polyester film further satisfies a relationship denoted by the following Expression 2:

$$20 \text{ ppm} \leq W_P \leq W_{Mg} \leq 55 \text{ ppm} \quad \text{(Expression 2)}$$

wherein in Expression 2, $W_P$ represents a content (ppm) of phosphorus in the biaxially stretched polyester film, and $W_{Mg}$ represents a content (ppm) of magnesium in the biaxially stretched polyester film.

5. The biaxially stretched polyester film according to claim 1,
    wherein the biaxially stretched polyester film is used in an optical sheet.

6. An optical sheet, comprising:
    the biaxially stretched polyester film according to claim 1; and
    an easily adhesive layer which is disposed on at least one surface of the biaxially stretched polyester film, and contains at least one type of resin selected from a polyester resin, a urethane resin, an acrylic resin, or a melamine resin, in an amount of greater than or equal to 50 mass %.

* * * * *